United States Patent
Mercat et al.

(10) Patent No.: US 7,563,186 B2
(45) Date of Patent: Jul. 21, 2009

(54) GEARSHIFT CONTROL DEVICE FOR A CHAIN AND SPROCKET TRANSMISSION SYSTEM

(75) Inventors: Jean-Pierre Mercat, Chavanod (FR); Bertrand Cauvin, Ars sur Formans (FR)

(73) Assignee: Salomon S.A.S., Metz-Tessy (FR)

( * ) Notice: Subject to any disclaimer, the term of this patent is extended or adjusted under 35 U.S.C. 154(b) by 666 days.

(21) Appl. No.: 11/289,712

(22) Filed: Nov. 30, 2005

(65) Prior Publication Data

US 2006/0116227 A1   Jun. 1, 2006

(30) Foreign Application Priority Data

Dec. 1, 2004   (FR) ................... 04 12738

(51) Int. Cl.
*B62M 25/08* (2006.01)
*B62M 9/12* (2006.01)
*F16H 59/00* (2006.01)
*F16H 63/00* (2006.01)

(52) U.S. Cl. .............. 474/78; 474/70; 474/71; 474/80; 474/82

(58) Field of Classification Search ............... 474/2, 474/58, 70, 71, 78, 80, 82; 74/594
See application file for complete search history.

(56) References Cited

U.S. PATENT DOCUMENTS

| | | | |
|---|---|---|---|
| 3,919,891 A | 11/1975 | Stuhlmuller | |
| 4,384,864 A | 5/1983 | Bonnard | |
| 4,504,250 A | 3/1985 | Juy | |
| 4,530,677 A | 7/1985 | Nagano | |
| 4,887,990 A | 12/1989 | Bonnard et al. | |
| 4,946,425 A | 8/1990 | Bühlmann | |
| 5,201,236 A | 4/1993 | Nagano | |
| 5,358,451 A | 10/1994 | Lacombe et al. | |
| 5,470,277 A | 11/1995 | Romano | |
| 5,494,307 A | 2/1996 | Anderson | |
| 6,443,032 B1 * | 9/2002 | Fujii et al. | ..................... 74/567 |
| 6,607,457 B2 * | 8/2003 | Kawakami | .................. 474/80 |
| 6,629,903 B1 | 10/2003 | Kondo | |
| 6,648,782 B2 | 11/2003 | Valle | |
| 6,761,655 B2 | 7/2004 | Fukuda | |
| 6,835,148 B2 | 12/2004 | Takebayashi et al. | |

(Continued)

FOREIGN PATENT DOCUMENTS

EP   0 482 559 A2   4/1992

(Continued)

*Primary Examiner*—Robert A Siconolfi
*Assistant Examiner*—Terry Chau
(74) *Attorney, Agent, or Firm*—Greenblum & Bernstein, P.L.C.

(57) ABSTRACT

A gearshift control device for a chain and sprocket transmission system including a gearshift member that is movable along a transverse direction relative to the plane defined by the chain, a shaft, a first driving element having a drive member that is non-centered or non-concentric with respect to the axis of the shaft, a second positioning element of the derailleur with an indexing device, a third control element mounted to rotate freely about the shaft with a blocking device, and a transmission element having a member for connection with the first driving element, the second positioning element and the third control element, the transmission element being operably between the first driving element, the second positioning element, and the third control element.

13 Claims, 23 Drawing Sheets

U.S. PATENT DOCUMENTS

| | | |
|---|---|---|
| 6,848,336 B2 | 2/2005 | Shahana |
| 6,868,752 B2 | 3/2005 | Tetsuka et al. |
| 6,899,649 B2 | 5/2005 | Ichida et al. |
| 7,011,590 B2 * | 3/2006 | Ichida et al. .................. 474/70 |
| 2002/0025868 A1 | 2/2002 | Fukuda |
| 2002/0061797 A1 | 5/2002 | Valle |
| 2004/0005949 A1 | 1/2004 | Tetsuka et al. |
| 2004/0025620 A1 | 2/2004 | Tetsuka et al. |

FOREIGN PATENT DOCUMENTS

| | | |
|---|---|---|
| EP | 0 558 425 A1 | 9/1993 |
| EP | 1 147 978 A2 | 10/2001 |
| EP | 1 378 436 A1 | 1/2004 |
| EP | 1 394 034 A2 | 3/2004 |
| EP | 1 394 035 A2 | 3/2004 |
| EP | 1 394 036 A2 | 3/2004 |
| FR | 2 621 372 A1 | 4/1989 |
| FR | 2 621 373 A1 | 4/1989 |

* cited by examiner

Fig: 8

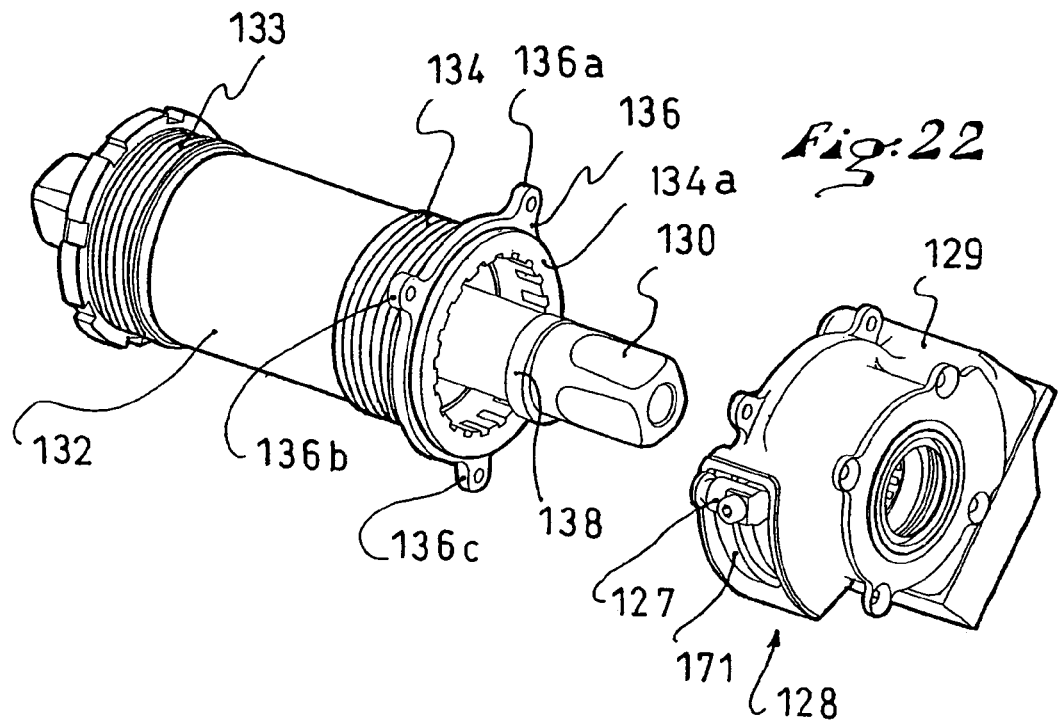
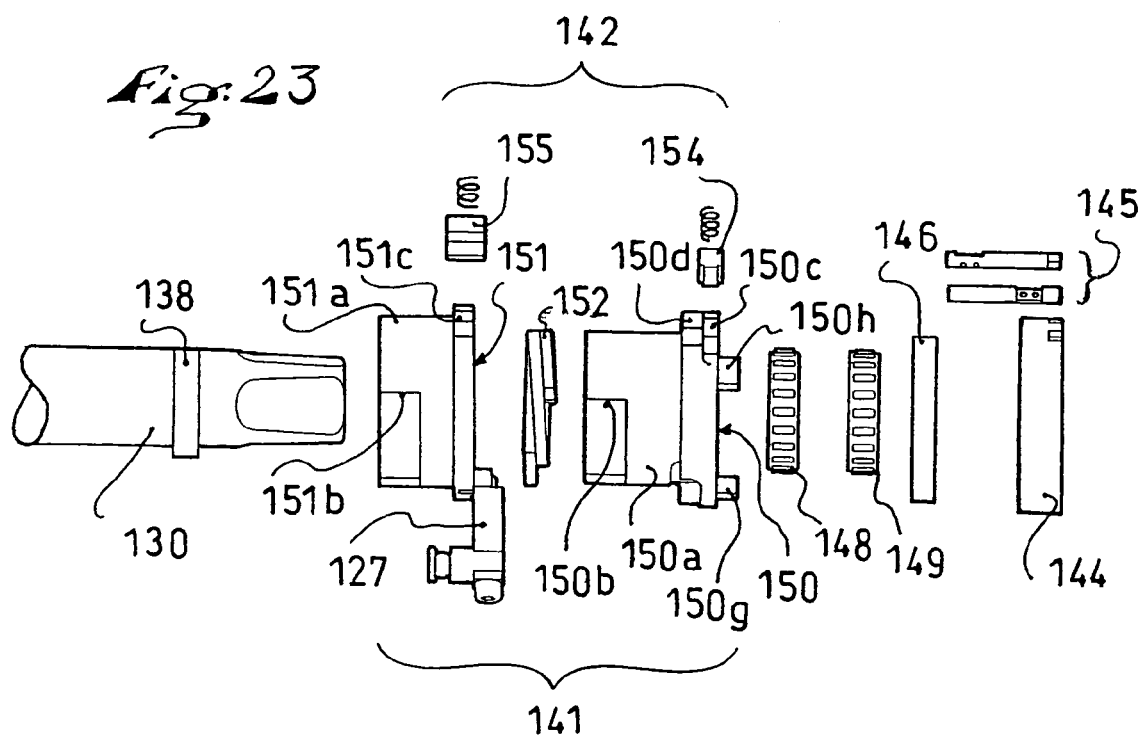

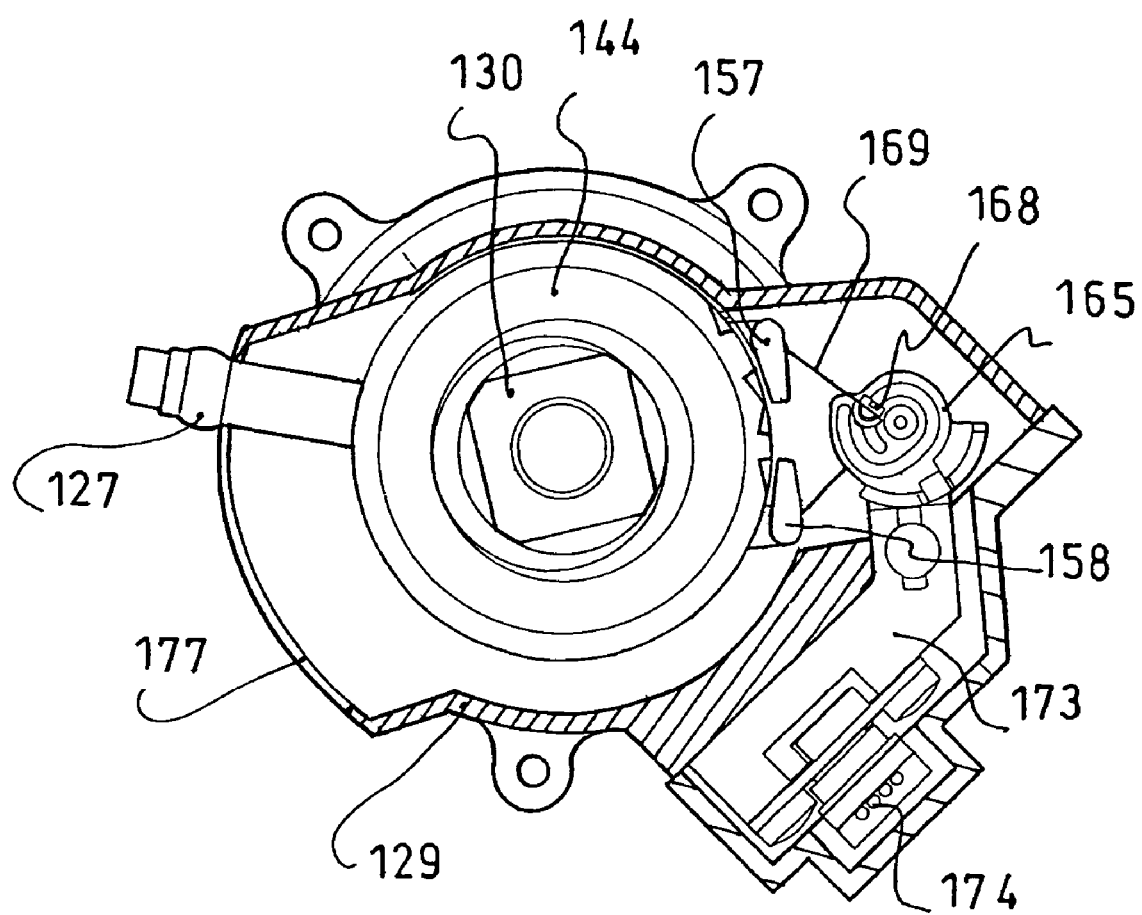

GEARSHIFT CONTROL DEVICE FOR A CHAIN AND SPROCKET TRANSMISSION SYSTEM

CROSS-REFERENCE TO RELATED APPLICATIONS

This application claims priority under 35 U.S.C. §119 of French Patent Application No. 04.12738, filed on Dec. 1, 2004, the disclosure of which is hereby incorporated by reference thereto in its entirety.

BACKGROUND OF THE INVENTION

1. Field of the Invention

The present invention relates to a gearshift control device for a chain and sprocket transmission system.

2. Description of Background and Relevant Information

In the field of bicycles, transmission is ensured, as a general rule, by an endless chain that is returned by a front transmission device and a rear transmission device.

The front transmission device includes a set of toothed chainwheels having varying diameters, which are rotationally coupled to the pedal cranks. Similarly, the rear device includes a set of sprockets, the number of teeth of which varies progressively. The sprockets are coupled to the rear wheel hub. The numbers of chainwheel and sprocket teeth used by the chain determine the transmission ratio between the crankset and the wheel. A front derailleur and a rear derailleur make it possible to force the chain into changing the chainwheel or the sprocket in order to vary the transmission ratio.

The rear derailleur usually includes one or two chain pulleys, on which the slack side of the chain passes. These pulleys are supported by an articulated cage generally of the deformable parallelogram type, which enables the displacement of the pulleys along a directional component that is parallel to the axis of the sprockets in order to position them in the plane of a defined sprocket.

At the front, the derailleur usually includes a movable fork-shaped cage that houses the tensioned side of the chain.

These front and rear derailleurs are mechanically controlled by cables connected to control levers or handles that are located on the handlebar or the front of the frame, within reach of the cyclist's hand. For these derailleurs, all the force used for gear shifting is provided by the cyclist's manual actuation of the control levers or handles.

Motorized derailleurs also exist, which generally implement an electric motor driven by an electric control. Such a derailleur is disclosed, for example, in U.S. Pat. No. 3,919,891.

Another electric derailleur construction method is proposed in European Patent Publication No. 0 558 425 and U.S. Pat. No. 5,358,451. Instead of being furnished with an electric motor, the force enabling the displacement of the movable assembly is provided by the rotation of one of the derailleur pulleys that are driven by the chain.

According to the construction disclosed, the derailleur includes a fixed assembly mounted on the frame and a movable assembly bearing the chain pulleys. The movable assembly is slidably mounted along an arm for supporting the fixed element; and an indexing device defines stable positions of the movable assembly in correspondence with each of the sprockets. The rotational movement of one of the chain pulleys is transformed by the guiding path of a cam into a to-and-fro movement of a rack housed within the support arm. During gearshift control, a solid connection is momentarily established between the rack and the movable assembly, in order to initiate the displacement of this movable assembly, along with the rack, toward an adjacent stable position defined by the indexing device.

This device yields good results. However, the mode of connection between the fixed assembly and the movable assembly by a sliding principle imposes constraints that result in a relatively cumbersome final construction and sealing conditions that are difficult to control.

Furthermore, completely mechanical gearshift systems are known, in which a portion of the mechanical force required to control the derailleur is drawn from the crank shaft. The documents EP 0 482 559 and U.S. Pat. No. 5,201,236 generally disclose a front derailleur equipped with such a system shown in FIG. 16 and subsequent figures. In addition, each of the following documents discloses a gearshift control device equipped with an assisting apparatus, although these devices involve a relatively complicated construction: EP 1 378 436 and family member U.S. Pat. No. 6,848,335; EP 1 394 034 and family members U.S. Pat. No. 6,868,752, US 2004/0005949, US 2004/0025620; EP 1 394 035 and family member U.S. Pat. No. 6,899,649; and EP 1 394 036 and family member U.S. Pat. No. 6,835,148.

Under these circumstances, and in view of these aforementioned disclosures, there is a need for a gearshift control device with improved construction in terms of space requirement and imperviousness to infiltration of outside elements.

SUMMARY OF THE INVENTION

To this end, the gearshift control device of a chain and sprocket transmission system according to the invention includes the following elements operatively arranged in the manner described below.

A gearshift member of the device is movable along a transverse direction relative to the plane defined by the chain, whereby a first element, comprising a driving element, is mounted to rotate, continuously and non-concentrically by the action of an external movable component, the driving element having a drive member that enables a periodic movement during its rotation. A second element, comprising a positioning element, is rotationally mounted about the shaft of the driving element, and an indexing device defines a plurality of angular stable but non-blocked positions of the second positioning element about the shaft. A third element, comprising a control element, is mounted to rotate freely about the shaft, and at least one blocking device is mounted for momentarily blocking the rotation of the control element about the shaft. A transmission element is positioned among the driving element, the positioning element, and the control element, the transmission element being non-concentrically movable relative to the shaft. The transmission element supports three connecting members arranged at a distance from one another, such connecting members including a first tracking member connected to the driving element element, a second connecting member connected by a pivotable connection to the positioning element, and a third connecting member connected by a pivotable connection to the control element. As the driving element is rotationally driven, the positioning element is retained in an angular stable position by the indexing device, and the control element is not blocked by the blocking device. The transmission element is actuated with an oscillating movement relative to the connection with the positioning element, and the control element is actuated with a rotational alternating movement about the shaft by means of the third connecting member and, upon a momentary blocking of the control element by the blocking device, the transmission element is actuated with a movement relative to the connection with the control element, and the positioning element is actuated with a rotation about the shaft via the second connecting member.

BRIEF DESCRIPTION OF THE DRAWINGS

The invention will be better understood from the description that follows and with reference to the drawings annexed thereto.

The description and drawings show various aspects of the invention that particularly involve the application of the invention to a rear derailleur and to a front derailleur, the construction of a rear derailleur equipped with an adjustable connection having an indexing arm, a reversible guiding device for a blocking device having two pawls, a positioning element with gearshift control compensation and memorization.

FIG. 22 is an exploded view of the crankset casing of FIG. 21 and of the driving unit;

FIG. 23 shows an exploded side view of the various components of the driving unit;

FIG. 31 is a block diagram showing the arrangement of the elements in the crank case.

DETAILED DESCRIPTION OF THE INVENTION

Figure 1:
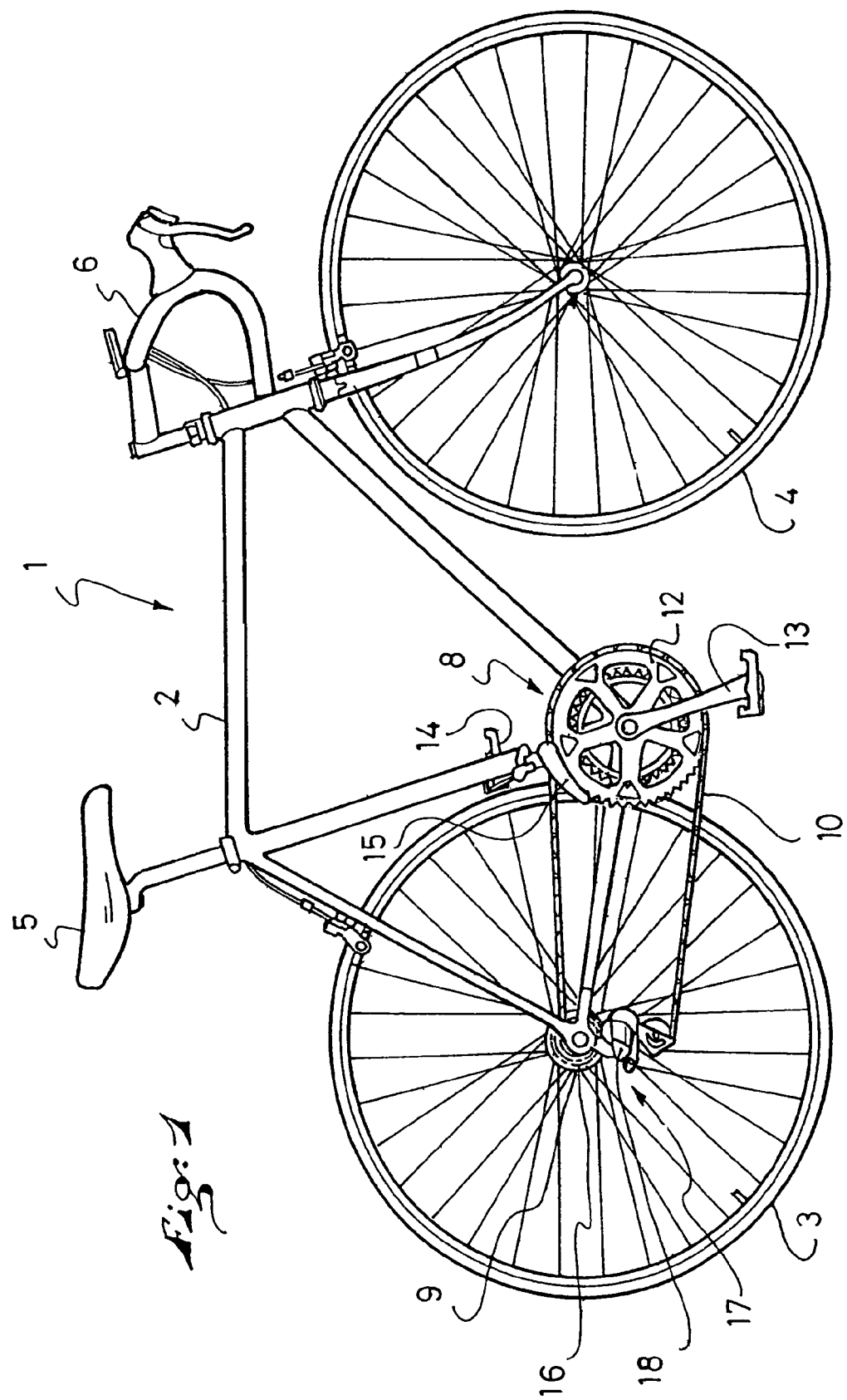
FIG. 1 is a side view of a bicycle.

The bicycle 1 shown in FIG. 1 includes the conventional arrangement of the following components: a frame 2, a rear wheel 3, a front wheel 4, a saddle 5, and a handlebar 6. The bicycle 1 is further equipped with a transmission assembly comprising a front subassembly 8, a rear subassembly 9, and a transmission chain 10 connecting these two subassemblies.

A set of chainwheels 12, levers and pedals 13, 14, and a front derailleur 15 form the front subassembly 8. A set of sprockets 16 and a rear derailleur 18 form the rear subassembly 17. In a known manner, the chainwheels and the sprockets have a different number of teeth that determines the transmission ratio between the crankset and the rear wheel; and the derailleurs make it possible to vary the transmission ratio by transferring the chain to and from an adjacent chainwheel or sprocket. The control of the derailleurs is located on the handlebar or on the frame; it will be described in more detail below.

This particular arrangement is not to be considered limiting, and other constructions could also be used within the scope of the invention. For example, a front subassembly could have only one chainwheel, without a derailleur, or a single chainwheel but with a varying diameter, or even a chainwheel associated with a variable ratio gear box.

Figure 2:
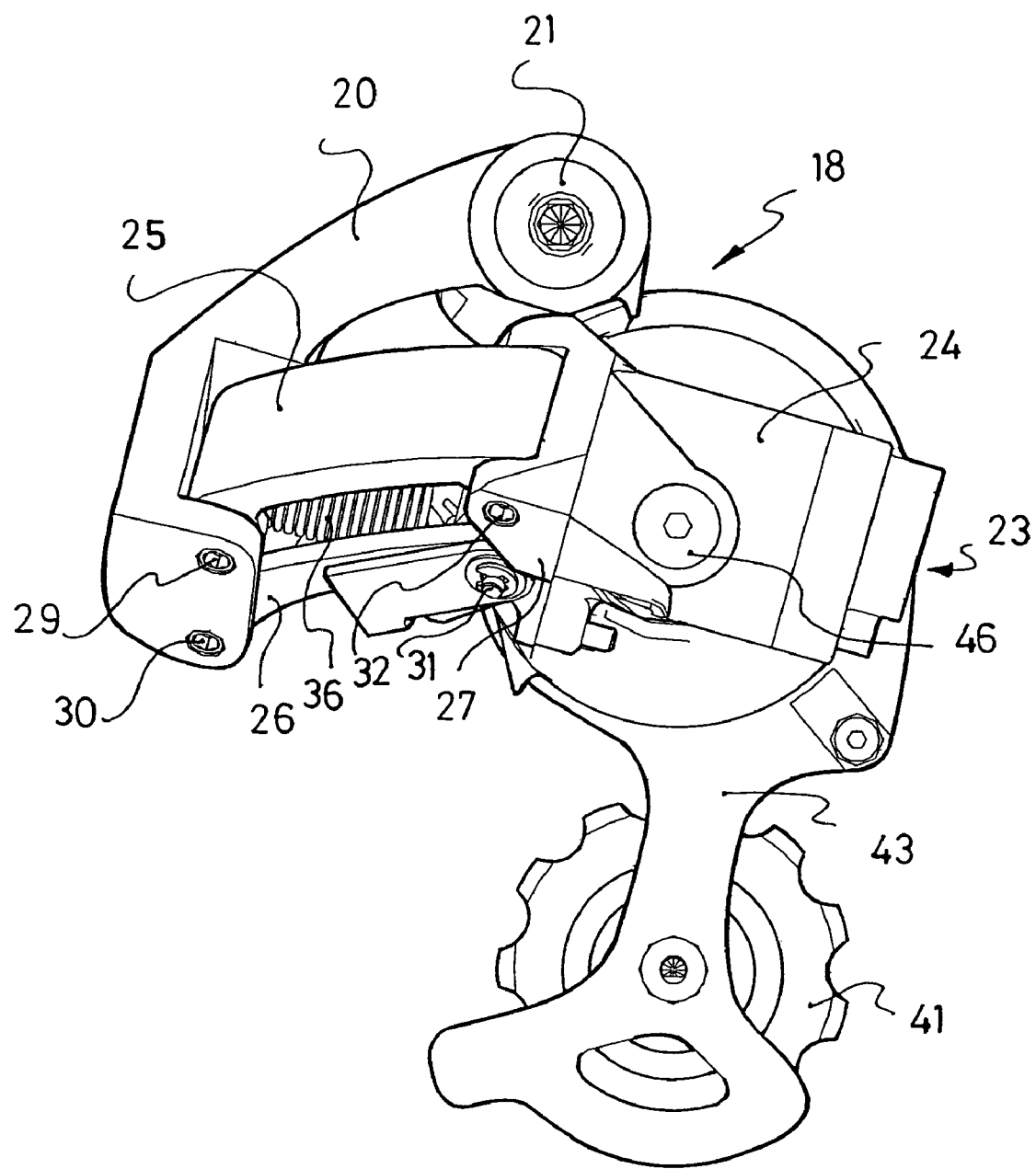
FIG. 2 is a general view of the rear derailleur according to a first embodiment of the invention.
Figure 3:
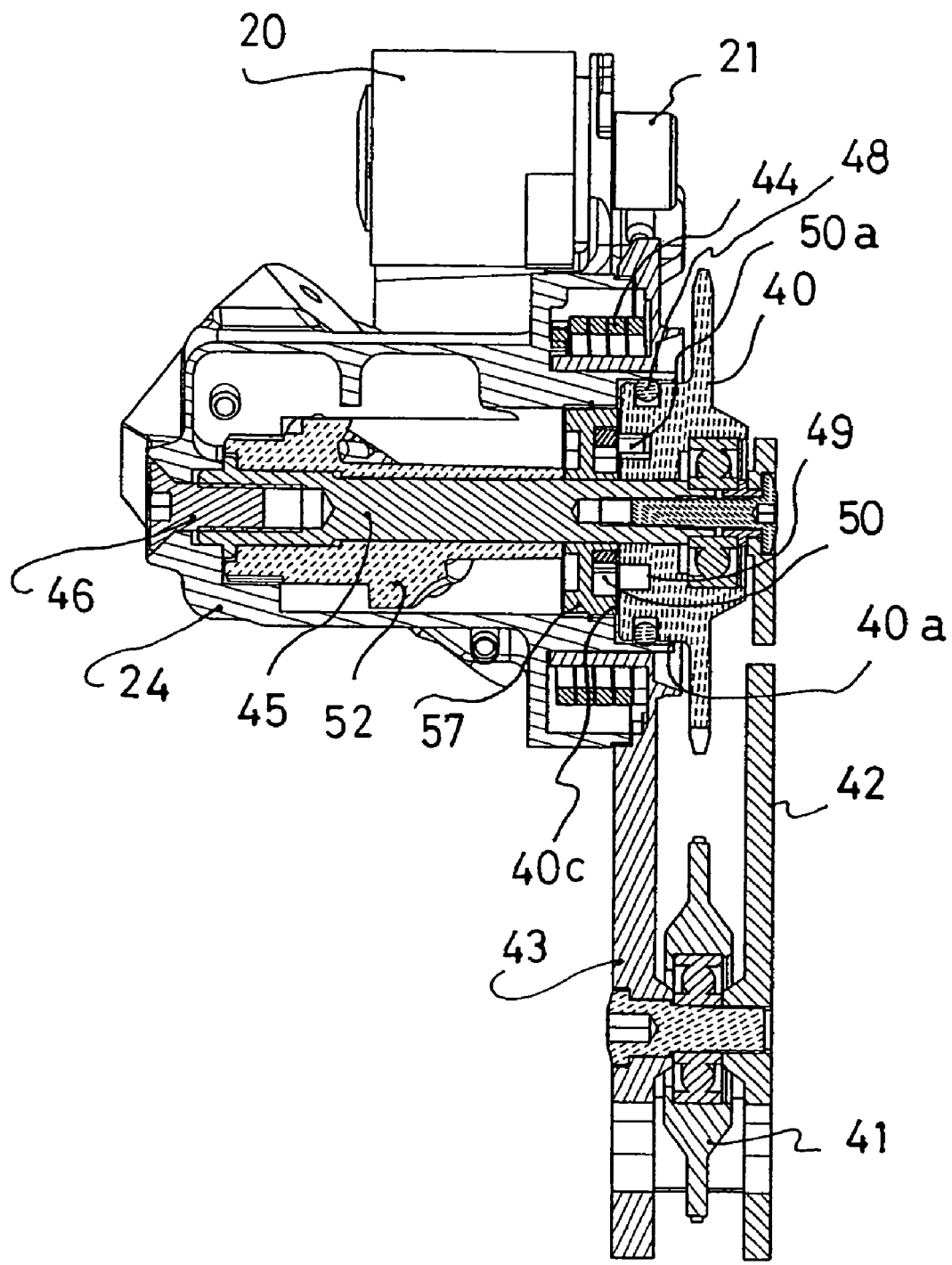
FIG. 3 is a sectional view of the derailleur of FIG. 2.

FIGS. 2 and 3 show the rear derailleur 18 according to a first, non-limiting embodiment of the invention. It includes a support leg 20 that is adapted to be assembled to the bicycle frame by any appropriate means known to those skilled in the art, such as by means of a screw/bolt 21 oriented axially relative to the axis of the sprockets and of the wheel. Conventionally, the support leg can pivot about the assembly screw, and it is elastically returned by a spring in a direction toward the rear of the bicycle, so as to take up the slack of the slack side of the chain.

The body 23 of the derailleur is connected to the support leg 20 by a mobile mechanism that is capable of displacing the body 23 in various positions indexed on each of the sprockets of the sprocket cassette. According to the embodiment shown, the mobile mechanism includes two linkage members 25, 26 that are articulated at the support leg 20 and at the base 27 of the body 23 by parallel articulation pins, or axles, 29, 30, 31, 32, so as to generally form a deformable parallelogram structure. As can be understood from FIG. 2, for example, the articulation axles 29, 30, 31, 32 are obliquely arranged relative to an axial direction defined by the axis of the wheel, so that the body 23 of the derailleur is movable in a path that is approximately parallel to the generatrix of the truncated cone formed by the sprockets during the deformation of the parallelogram.

Figure 4:
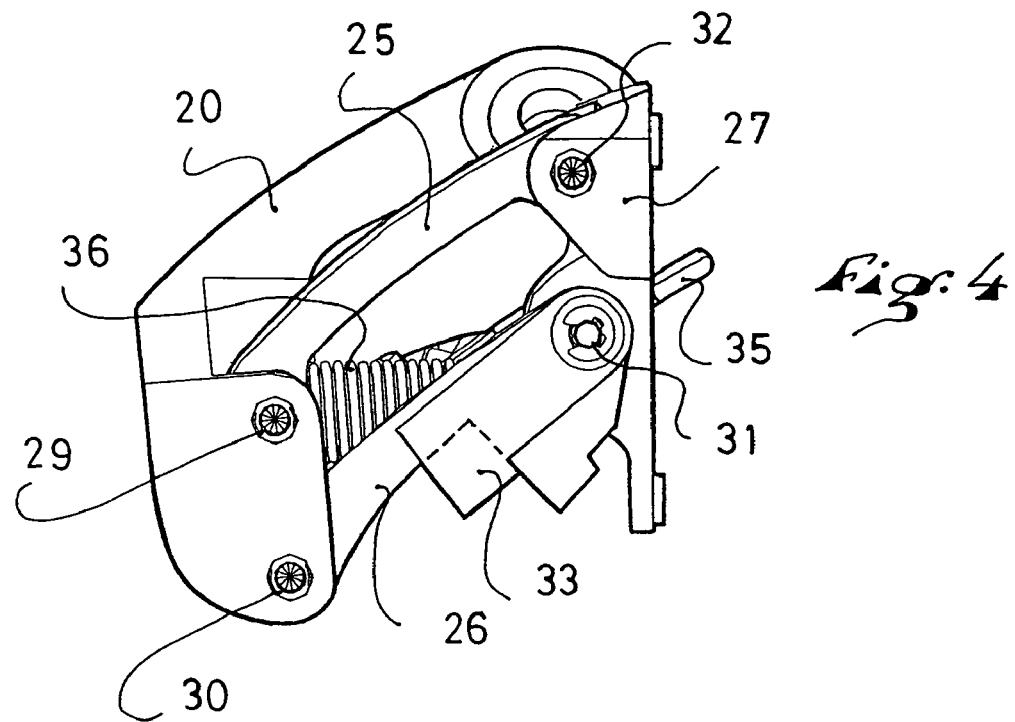
FIG. 4 shows the deformable parallelogram of the derailleur.
Figure 5:
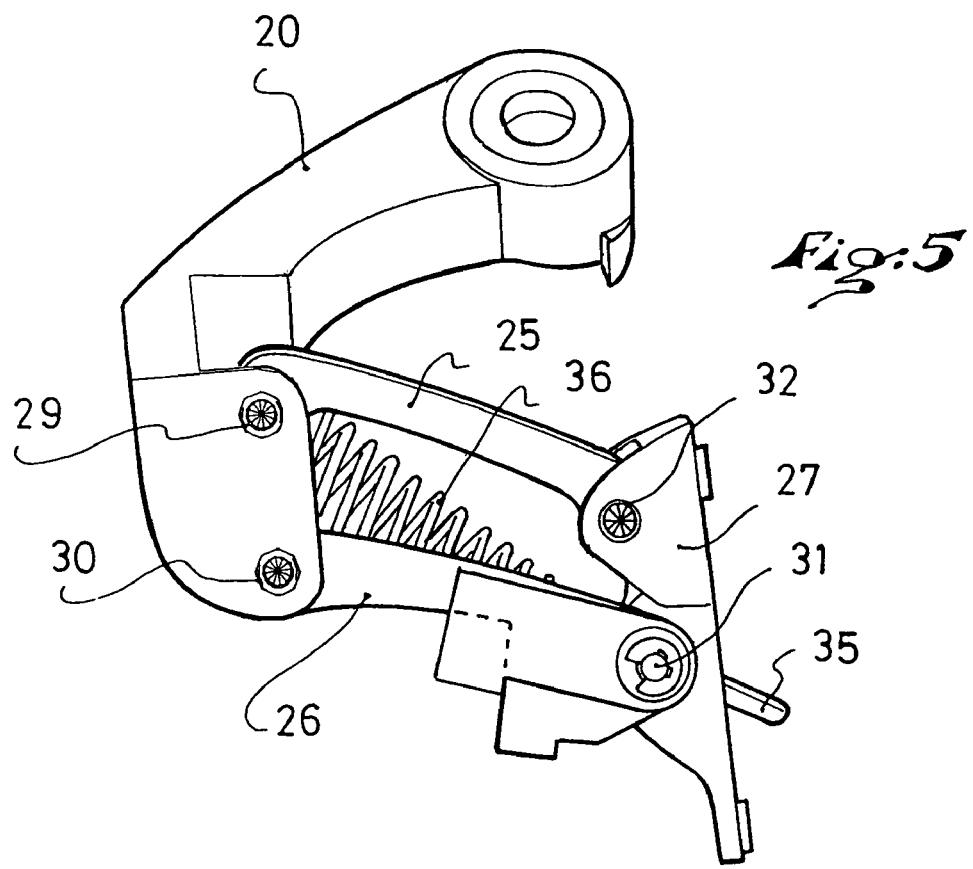
FIG. 5 shows the deformable parallelogram in a different position.
Figure 6:
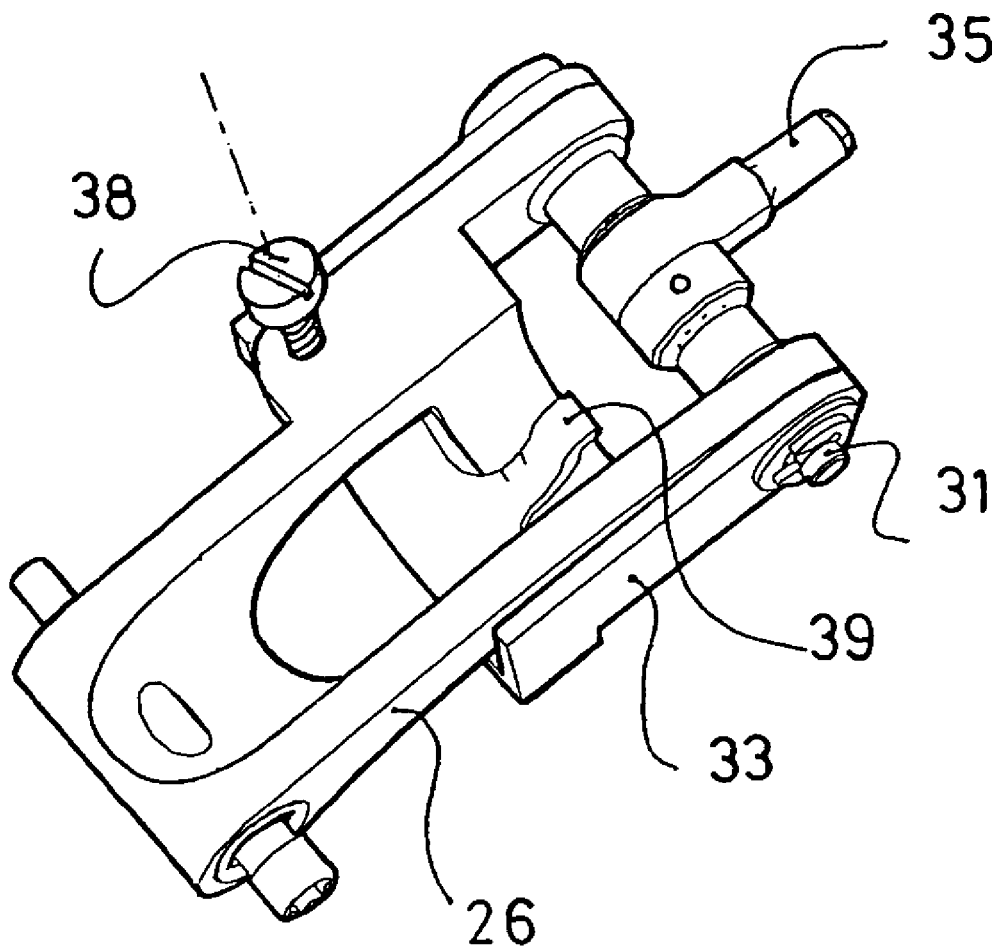
FIG. 6 shows the device for adjusting the deformable parallelogram.

FIGS. 4 and 5 show the deformable parallelogram structure in two functioning extreme positions.

In the illustrated embodiment, the deployment of the parallelogram structure is driven by an indexing arm 35, on the one hand, and by a return spring 36, on the other hand. The indexing arm 35 is engaged within the casing 24. The arm 35 is rotationally affixed to a stirrup 33 that is mounted on the articulation axle 31, between the linkage member 26 and the base 27. For example, the arm 35 and stirrup 33 are rotationally affixed to the axle 31 by means of a through pin. The axle 31 and the stirrup 33 are rotationally affixed by means of a mechanical coupling in the area of the head of the axle. Other modes of construction can also be suitable. The arm and stirrup could also be mounted on the axle 32.

The stirrup 33 straddles the linkage member 26, and an adjustment mechanism makes it possible to adjust the angular deviation between the stirrup and the linkage member. According to the embodiment shown, the adjustment mechanism is a screw 38 that is screwed into a threaded housing of the linkage member 26, and is in abutment against the stirrup 33. The return spring 36 is connected on one side to a lug 39 of the stirrup 33 and to the articulation axle 29 that is opposite the axle 31 in the parallelogram structure.

The spring elastically returns the parallelogram structure to the folded position of FIG. 4, where the linkage members are brought back near the support leg 20. It also ensures a constant contact between the screw 38 and the stirrup 33 and, therefore, maintains a constant angular deviation between these two elements. Furthermore, it eliminates any backlashes that may exist between the various elements of the structure.

If the indexing arm 35 is actuated by increasing the angle between the arm and the base 27, the parallelogram structure then deploys progressively over a range extending up to the extreme position shown in FIG. 5. Conversely, if the angle is allowed to decrease, the structure then collapses progressively by action of the return spring 36.

Imperviousness in the area of the indexing arm is provided between the axle 31 and the base 27. This imperviousness can be easily obtained by means of an O-ring seal or any other appropriate device.

The deformable parallelogram structure is therefore compact and easy to seal; and the adjustable connection between the stirrup and the linkage member makes it possible to simply adjust the derailleur in order to align the chain correctly with the plane of the various sprockets.

Other constructions of the mobility member could be used.

Conventionally, the derailleur further includes two chain pulleys 40 and 41 mounted between two flanges 42 and 43, forming a cage, or guide for the chain. The upper pulley 40, or guide pulley, sometimes referred to as the jockey wheel or pulley, is rotationally mounted about a shaft 45 borne by the body 23 of the derailleur, and the cage is rotationally articulated about this axle. For example, the shaft is assembled to the casing 24 by means of a screw 46 screwed into its end. A prestressed spring 44 housed in the body 23 biases the cage toward the rear of the bicycle. The lower pulley 41, or tension pulley, is free to rotate about its axis for connection with the cage. In a known fashion, the two pulleys, the cage, and the return spring compensate for the slack of the slack side of the chain, thereby appropriately tensioning the chain. The two pulleys rotate about their respective support axes. The upper pulley 40 is preferably toothed at the same pitch as that of the chain, so that the chain forces this pulley to rotate with its own movement.

Figure 7:
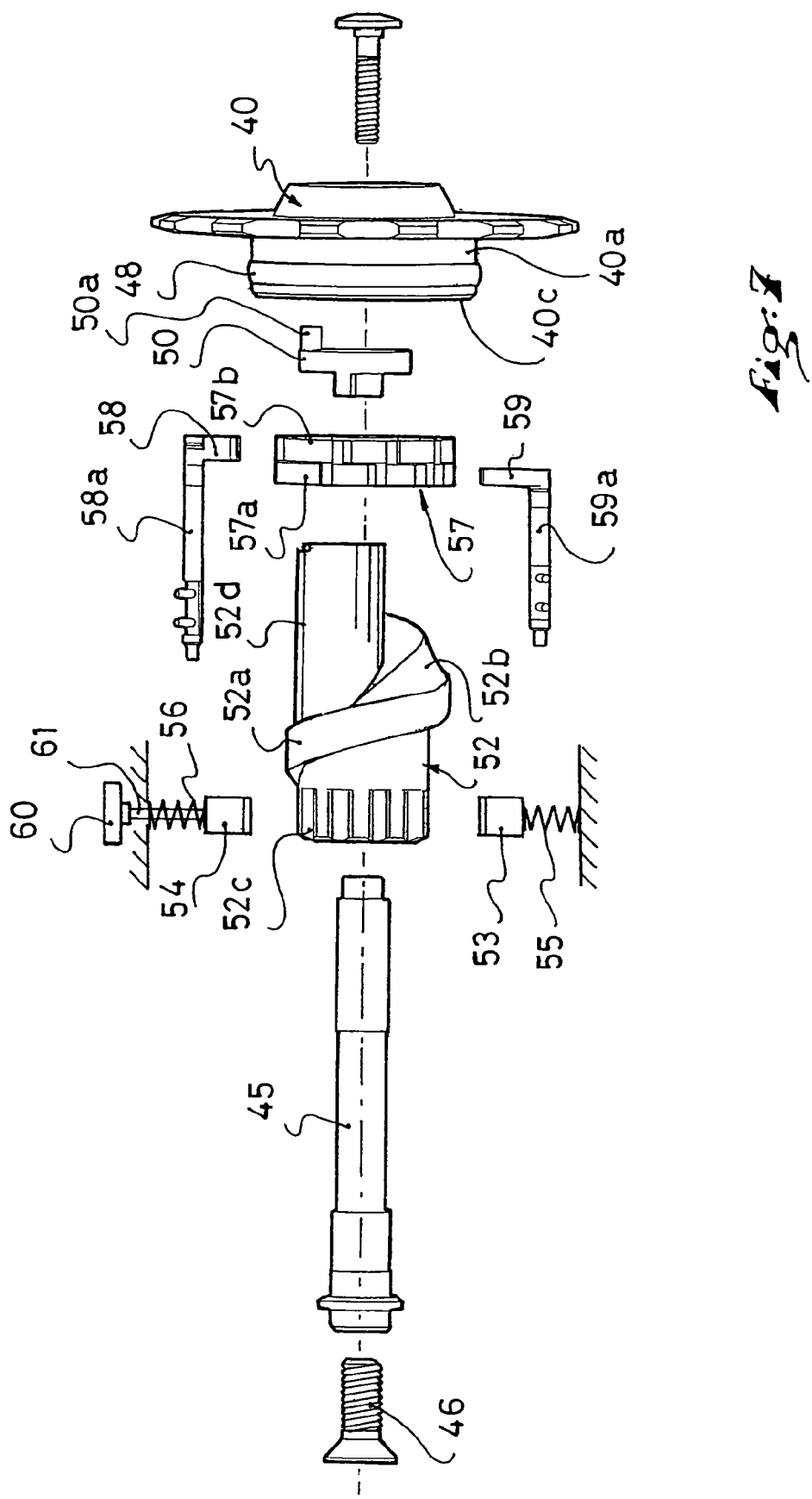
FIG. 7 is an exploded view of the driving unit that drives the deformation of the parallelogram.

FIG. 7 shows an exploded view of the elements of the driving unit according to a first embodiment of the invention.

Initially, these elements include the pulley 40, which is the first driving element. The pulley 40 is borne by the shaft 45 which extends through the casing 24. The roller is retained on the shaft by any appropriate means, such as a screw screwed into the end of the shaft, for example. The pulley 40 is rotationally mounted on the shaft by means of a bearing, for example. As is mentioned above, the other end of the shaft is assembled to the casing 24 by any appropriate means, such as a screw 46, for example. The shaft 45 is oriented so as to be perpendicular to the plane defined by the chain. Being the first driving element, the pulley 40 is rotationally driven by the action of an external movable component of the device of the invention, i.e., the chain of the bicycle.

According to the illustrated mode of construction, the central body 40a of the pulley 40 is cylindrical. It extends through the wall of the casing 24; an O-ring seal 48 or any other appropriate means provides imperviousness between the casing and the pulley in this area.

Figure 8:
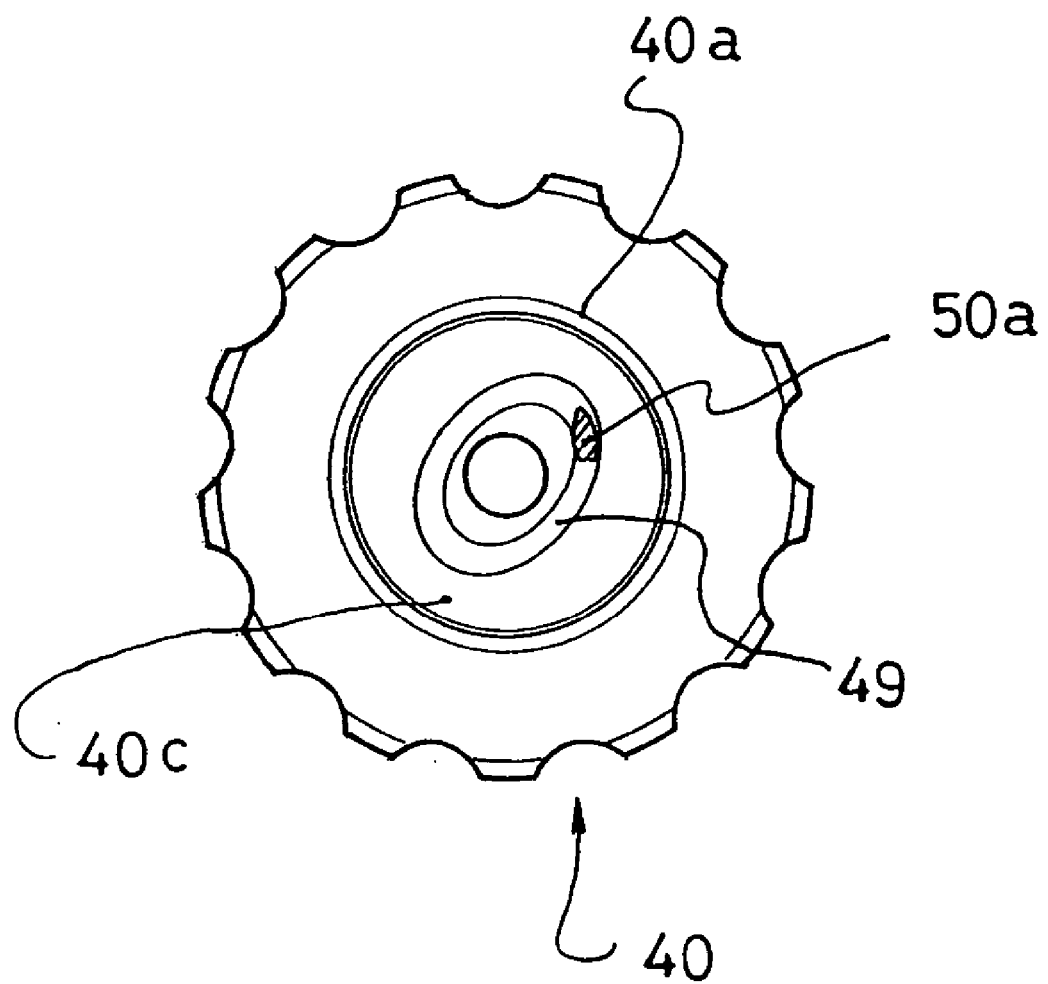
FIG. 8 shows the return roller of the driving unit.
Figure 9:
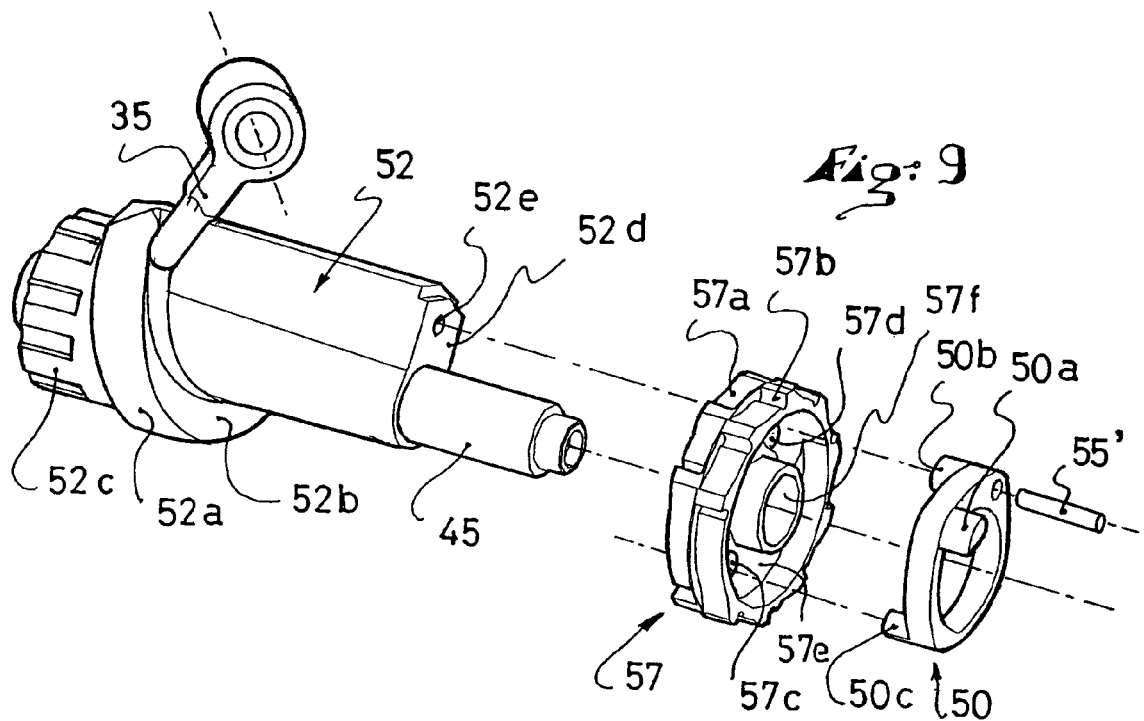
FIG. 9 is a detailed view of the other elements of the motor assembly.
Figure 10:
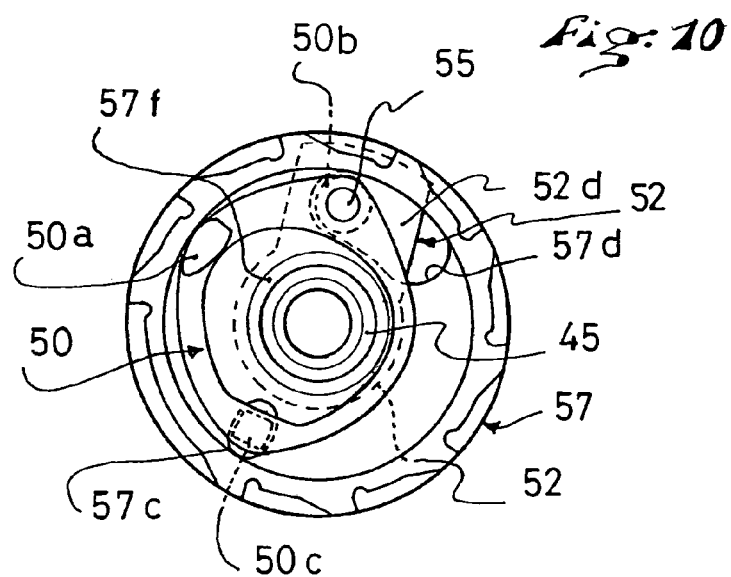
FIG. 10 shows the elements of FIG. 9 assembled to one another.

FIG. 8 shows the pulley 40 on the side of its surface 40c which is oriented inward of the casing 24. In the area of the surface 40c, a generally oval or elliptical groove 49 is made in the body 40a. The groove is non-concentric relative to the axis of the shaft 45; it has two zones that are spaced farther from the axis of the shaft, and two zones that are closer to the axis of the shaft. Other shapes could be used, in particular a circular or oval shape off-centered relative to the axis of the shaft 45 and defining one zone spaced from the axis and one zone closer thereto; a triangular shape defining three spaced zones, corresponding to the three vertexes, and three closer zones.

Other modes of construction are also suitable and encompassed by the invention. The main principle here lies in that the rotation of the pulley about the shaft can generate a periodic alternating movement by means of a drive member that is non-concentric relative to the shaft or non-centered on its axis. A generally oval or elliptical groove forms a first embodiment of such a drive member. It can generate two periods of an alternating movement per pulley revolution; a generally circular groove could generate one period, a triangular groove three, a square groove four, and so on, thereby multiplying the oscillation frequency of the system, and therefore its rapidity. Instead of being recessed, the member could be embossed; alternatives thereof are described below.

The driving further includes, within the casing 24, a positioning element with its indexing device defining stable but non-blocking positions, a control element and its blocking device, and a transmission element establishing a connection between the member for driving the pulley 40 and the positioning and control elements. The indexing element 35 is engaged with the positioning element that is prestressed by the return spring 36 of the mobility member.

According to the mode of construction shown in the drawing figures, the positioning element 52 is generally shown in the form of a rotor. It is mounted to rotate freely about the shaft 45. The rotor 52 bears a cam 52a on its periphery. The cam 52a has an approximately helical surface 52b against which the indexing arm 35 takes support by action of the spring 36. The rotation of the cam 52a causes the rotational displacement of the arm 35 and of the stirrup 33 to which it is affixed.

An angular indexing device is provided to define stable positions of the derailleur body in correspondence with each of the sprockets. The rotor 52 has on its periphery a channeled zone 52c against which two pistons 53 and 54 take support by action of the springs 55 and 56. The pistons and the springs are housed in appropriate housings of the body 23 of the derailleur; the pistons are guided in these housings. Each channel recess corresponds to an angular stable position of the rotor 52 and of its cam 52a about the shaft 45. The spacing of the channels and the shape of the helical surface 52b are determined in relation to the spacing of the sprockets, so that the displacement pitch of the derailleur body between two successive stable positions is substantially equal to the spacing pitch of the sprockets. The fine adjustment for aligning the chain with the sprockets is done by means of the screw 38 between the stirrup 33 and the linkage member 26. For a ten-speed derailleur, the angular pitch of the channels is 36 degrees. According to a particular mode of construction of one of the pistons, the piston 54 in FIG. 7 actuates a switch 60 by means of a rod 61. Thus, the state of the switch changes as a function of the position of the piston 54 inside an indexing channel or outside of the channels. In the area of the control system, the signal coming from the switch 60 makes it possible to detect the moment when a new stable position of the derailleur has been reached. The switch is positioned on the motor support plate which is described below in relation to the control of the ratchets.

The presence of two opposed pistons enables a radial balance of the forces and, therefore, the friction on the rotor. A single indexing piston can also be used.

Toward its end positioned on the side of the pulley 40, the rotor 52 has a support 52d that is offset relative to the axis of rotation of the rotor 52. The support 52d is provided for an articulation axis that is parallel to the axis of the shaft 45 and off-centered relative to the shaft, which is described below.

A control element 57 is located between the positioning element 52 and the pulley 40.

The control element 57 is in the form of a drum. It is mounted so to rotate freely about the shaft 45 and it has on its periphery two toothed crowns 57a, 57b, with teeth inclined along a sloping blocking surface and a non-blocking surface. The teeth of each of the crowns have an inverted inclination in order to form, together with two pawls 58 and 59, a double ratchet wheel having two different blocking directions depending upon the pawl that is engaged in its associated toothing.

Each of the toothed crowns has a number of teeth that is equal to the number of transitions of the derailleur between two successive sprockets. Preferably, a space is created between the first tooth and the last tooth. Thus, for a ten-speed derailleur, each toothed crown is divided into ten sectors, nine of which have one tooth and the tenth of which does not have any tooth.

The two pawls are each pivotally mounted about an axle 58a, 59a borne by the casing 24 and oriented parallel to the shaft 45. Relative to its axle 58a, 59a, each of the pawls is oriented one in the direction of the other in order to be capable of blocking the control element in a different direction of rotation. The pawls 58, 59 and the toothings 57a, 57b on the periphery of the drum form a device for blocking the control element.

The central portion of the control element 57 is recessed between its hub 57f that is traversed by the shaft 45 and the toothed crowns 57a, 57b. In this zone, the element 57 has a wall 57e with two recesses 57c, 57d that are approximately diametrically opposed. These recesses are described in more detail below.

The transmission element between the pulley 40, the positioning element 52 and the control element 57 is shown in the form of a floating ring 50 having a large central recess traversed by the shaft 45. The central recess of the ring 50 has adequate dimensions to enable the ring to oscillate without interference with hub 57f mounted on the shaft 45, as is described below. The ring is mounted against the pulley 40, and it is housed in the central recessed portion of the element 57.

The ring 50 has members for connection with each of the elements 40, 52, 57, i.e., connecting members, or studs, 50a, 50b, 50c, as described below. The ring 50 bears a first projecting stud 50a that is engaged in the groove 49 of the pulley 40, as seen in FIG. 8. As can be seen, the cross-section of the stud 50a is cone-shaped, or bullet-shaped, on a radial plane in order to facilitate the connection in the area and to ensure a good transmission of force. The rotation of the pulley 40 imparts an alternating movement on the stud 50a, during which it moves away from and comes closer to the axis of the shaft 45.

The member for connection with the positioning element 52 is formed by an articulation pin 55' that connects the support 52d of the rotor 52 with a second projecting stud 50b of the ring 50. This stud 50b extends within the recess 57d which has been described above in connection with the control element 57. The recess 57d has adequate dimensions so as not to interfere with the stud 50b.

When the positioning element 52 is in a stable position defined by its indexing device, the pin 55' forms an axis of rotation for the ring 50, about which it oscillates under the effect of the circulation of the stud 50a in the groove 49 of the pulley 40.

The ring 50 carries a third member for connection with the control element 57. This third connecting member is a projecting stud 50c housed in the second housing 57c of the control element 57. The shape of the housing 57c enables a rotational coupling of the ring 50 to the control element 57. It also enables a radial clearance of the stud in the recess over a reduced amplitude. Alternatively, one could have this radial clearance in the area of the pin 55'.

Thus, the ring 50 receives an alternating movement through its stud 50a, and it is connected to the positioning element 52, the angular stable positions of which are marked by hard spots that can be overcome, and to the control member 57 that is rotationally free but can be blocked in either direction by either one of the pawls. Under these conditions, the ring 50, during its oscillating movement, takes support on the element from which it receives the most resistance and transmits its oscillating movement to the element that opposes the least resistance.

The assembly functions as in the following manner.

At rest, the positioning element 52 is in an angular stable position defined by the engagement of the pistons 53 and 54 in respective ones of the channels of the zone 52c. The two pawls are released from the two toothed crowns 57a and 57b. The control element 57 is therefore free to pivot about the shaft 45.

Under these conditions, the ring 50 oscillates in pendular motion about the pin 55' relative to the control element, and drives the control element 57 by means of the stud 50c in an alternating rotational movement relative to the shaft 45.

If a pawl 58, 59 is engaged in its associated toothing, two situations arise depending upon the direction of rotation of the control element 57.

In the active phase of the alternating angular movement in which the control element 57 moves in the ratchet wheel blocking direction, the control element 57 is blocked by the pawl as soon as the latter meets the sloping surface of a tooth. As a result, the ring takes support on the control element from which it receives the most blocking resistance and reactionally transmits its oscillating movement to the positioning element 52 by means the stud 50c. The positioning element is thereby forced to pivot toward the next indexing position, in the opposite direction of rotation of the control element 57 which is hindered by the pawl. Arrangement is made so that the amplitude of the rotational movement that the ring transmits to the positioning element is greater than an indexing pitch of the positioning element 52, in order to allow for the shift of at least one gear during a phase of the alternating rotational movement. For a ten-speed derailleur, the angular pitch of the channels for indexing the zone 52c and of the teeth of the toothed crown 57 is 36 degrees; the angular amplitude of the movement of the ring 50 is 42.5 degrees. The angular movement amplitude (42.5 degrees) of the ring is greater than the indexing pitch of the positioning element 52 (36 degrees) so as to enable the element to be driven and to allow for an angular clearance (6.5 degrees) in order to enable the engagement of the ratchet against the sloping surface of a tooth. To this end, the positioning element and the two toothed crowns are angularly indexed. These values are only provided by way of example.

In the other passive phase of the alternating movement, in which the control element moves in the non-blocking direction of the pawl, the ring pivots relative to the positioning element 52 that opposes a resistance to pivoting that is greater than that opposed by the control element. The ring transmits its oscillating movement to the control element, and the pawl slides along the non-blocking surface of the tooth. In the case where the pawl jumps over the tip of a tooth, it falls back at the bottom of the sloping surface without interrupting the pivoting of the control element. During the next alternation, the pawl opposes the rotation of the control element, thus causing a rotation of the positioning element, as has been described above.

If the other pawl is engaged in its toothed crown, the functioning is similar, except that the control element is driven in the other pivoting direction, and the active and passive phases are reversed.

Thus, depending upon the pawl that is engaged in the series of teeth associated with the control element, the oscillating movement of the ring is transmitted to the positioning element by a rotation in either direction. Each direction of rotation of the control element corresponds to a rotation of the indexing arm in either direction, and therefore to a deformation of the parallelogram structure in either direction. In this way, a displacement of the body of the derailleur can be controlled for upshifting or downshifting.

It must be noted that during a rotation of the positioning element, the entire driving unit pivots one pitch about the shaft 45, with the exception of the pawls that remain in the same position. That is the reason why the crowns have teeth over their entire periphery, and the reason why the teeth on the periphery of the crowns are arranged along the same angular pitch as the channels of the indexing device.

To facilitate the transmission of forces, the two studs 50b and 50c for driving the driving element are spaced as far from each other as possible, and the stud 50a is located approximately halfway between these two studs. For example, as shown for the ring, the two studs are diametrically opposed, and the stud 50a is located on the periphery of the ring, at equal distance from the other two. Under these conditions, the displacement amplitude of the two studs 50b and 50c is amplified relative to the displacement amplitude of the stud 50a.

It must also be noted that for one control mode, the positioning element 52 rotates in the same direction as the pulley 40, and that for another mode, it rotates in the opposite direction. As a result, the ring 50 needs less force to drive the positioning device for the first mode than for the other mode. Under these conditions, arrangement is made so that the passage from one stable position to the next, in the indexing area, is easier in one direction than in the other. Furthermore, arrangement is made so that the first control mode corresponds to a deformation of the deformable parallelogram, in which the return spring 36 is expanded.

The drive member mode of construction that has just been described is not limiting; other constructions are possible.

Figure 11:
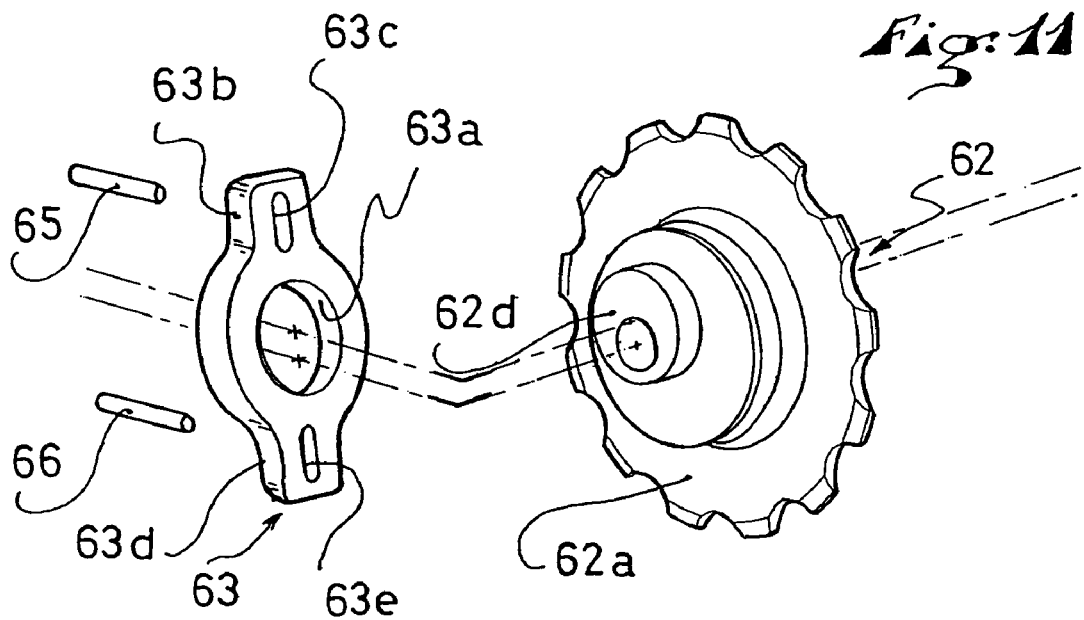
FIGS. 11 and 12 shows alternative embodiments.

For example, as shown in FIG. 11, the body 62a of the upper pulley 62 is extended by a revolving cylindrical hub 62d that is off-centered relative to the axis of the shaft. The first driving element is a kind of rocker 63 having a central hole 63a through which it is mounted so as to rotate freely relative to the off-centered hub 62d. The rocker 63 has an upper arm 63b with a slot 63c through which a connecting pin 65 extends that is nested in a housing of the positioning element in the same manner as the aforementioned pin 55'. On the opposite side, the rocker 63 has a lower arm 63d with a slot 63e in which a pin 66, nested in the control element, circulates.

This construction functions similar to that which has been described above. The hub 62d actuates the rocker 63 with an oscillating movement. As long as the control element is not blocked by a pawl, the rocker oscillates while taking support on the pin 65 and transmits its movement to the pin 66, i.e., to the control element. In the case where the control element is blocked, the rocker takes support on the pin and transmits its movement to the pin 65, i.e., to the positioning element.

For this alternative, the position of the slots and of the pins could be inverted. A connecting rod could also be added, and the groove could be replaced by a pivot.

Figure 12:
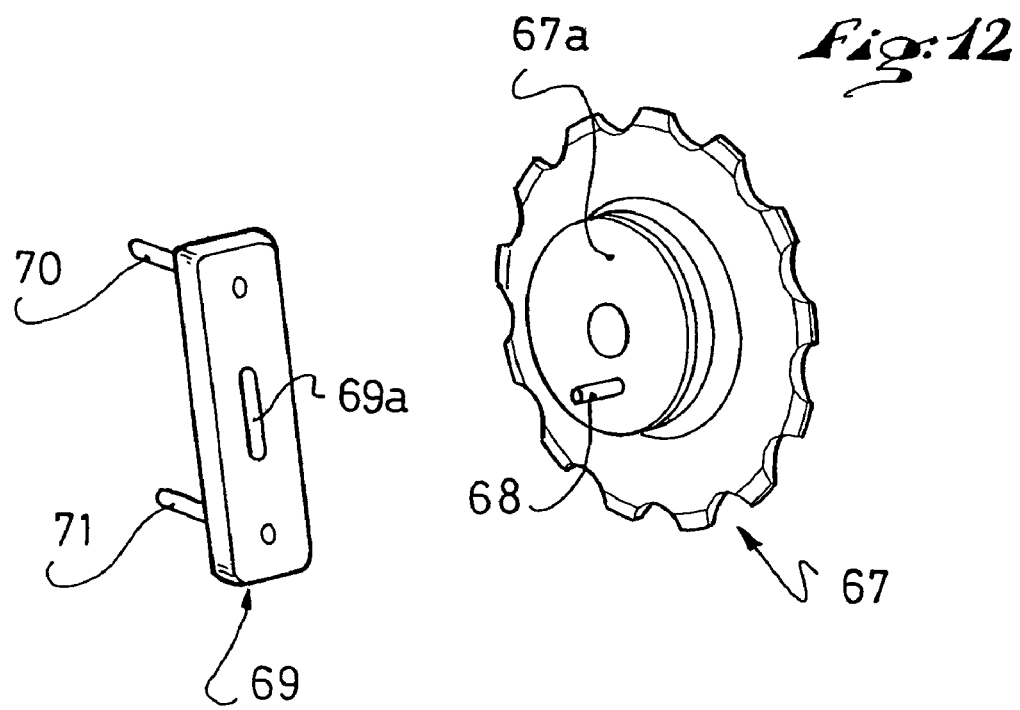

According to the alternative embodiment shown in FIG. 12, the body 67a of the upper pulley 67 bears a pin 68 that is axially oriented and off-centered relative to the axis of rotation of the pulley. The drive member is a bar 69 that has a slot 69a in its central portion, and two connecting pins 70 and 71 toward each of its ends. These pins are engaged in housings of the control element and of the positioning element, respectively. According to this embodiment, one of the housings is a slot in which the pin can circulate freely.

The alternating movement is generated by the circulation of the pin 68 in the slot 69.

This alternative construction has the same functioning mode as that described above, but allows for only one to-and-fro movement of the ring to be generated for one rotation of the pulley.

Figure 13:
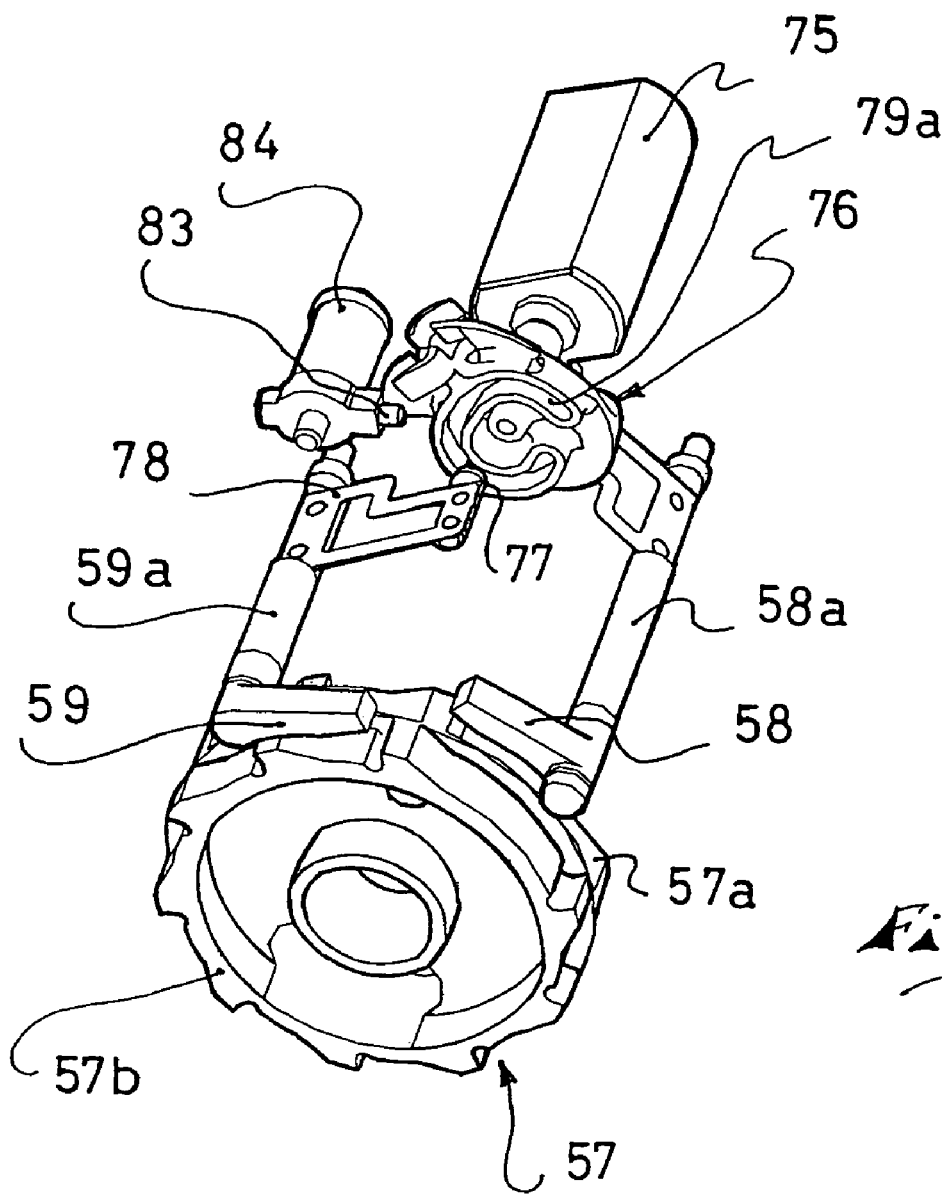
FIG. 13 shows a perspective view of the device that guides the control element of the driving unit.

Various driving devices can be used to control the blocking of the control element. According to the embodiment shown in FIG. 13, it is an electric motor 75 that controls the engagement and disengagement of the two pawls. The motor 75 is driven by an electric circuit 74 (see FIG. 15); it is fed by direct current with inverted polarity to reverse the direction of rotation. The motor 75 and the circuit 74 are mounted on a motor support plate 89 shown in FIG. 16.

At the shaft outlet, the motor has a cam 76 having a radial cam groove on each of its surfaces for each of the pawls. Only the radial cam groove 79 is visible in FIGS. 13, 14; the other cam groove has an opposite shape. The cam 76 here is in direct engagement with the shaft of the motor 75.

The radial cam groove 79 forms a kind of groove in which a radial tracking finger 77 is engaged. The tracking finger is connected to the axle 59a of the pawl 59 by an elastic blade 78. By following the radial cam groove 79, the radial tracking finger 77 controls the rotation of the pawl 59 between a position in which the pawl is released from its toothed crown 57b and a position where it is engaged in the toothed crown. In the case where an engagement control is transmitted to the pawl while the end of the pawl is not opposite the sloping surface of a tooth, the cam accomplishes the complete movement, and it is the elastic blade 78 that becomes deformed in order to compensate for the movement that the pawl cannot carry out, and presses the latter against the surface of the tooth, enabling it to engage in the tooth as soon as the tip of the tooth has been cleared.

The other pawl has the same functioning mode, except that the radial tracking finger takes on its assignment on the other surface of the cam.

Figure 14:
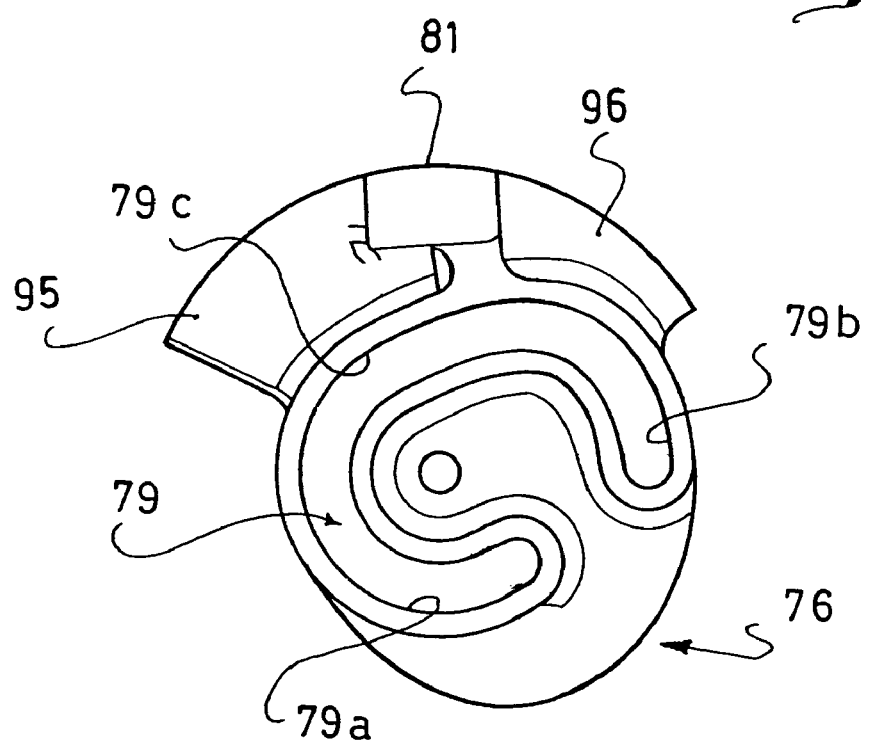
FIG. 14 shows a front view of the cam of the control device of FIG. 13.

With reference to FIG. 14, the radial cam groove extends about the axis of rotation of the cam over a little less than 360 degrees. The radial cam groove has three portions: an inactive portion 79a, in which the radial cam groove remains at a substantially constant distance from the shaft, an active portion 79b, in which the distance from the axle increases progressively, which causes the rotation of the pawl and its engagement in the teeth of the toothed crown. Between these two portions, the cam groove has a re-centering portion 79c, in which the distance from the axis is substantially the same as for the inactive portion. When the tracking finger of a pawl is in the active portion of its cam groove, the other tracking finger is in the inactive portion, and vice versa. When the tracking finger is in the re-centering portion, the other tracking finger is also in the re-centering portion.

Figure 14A:
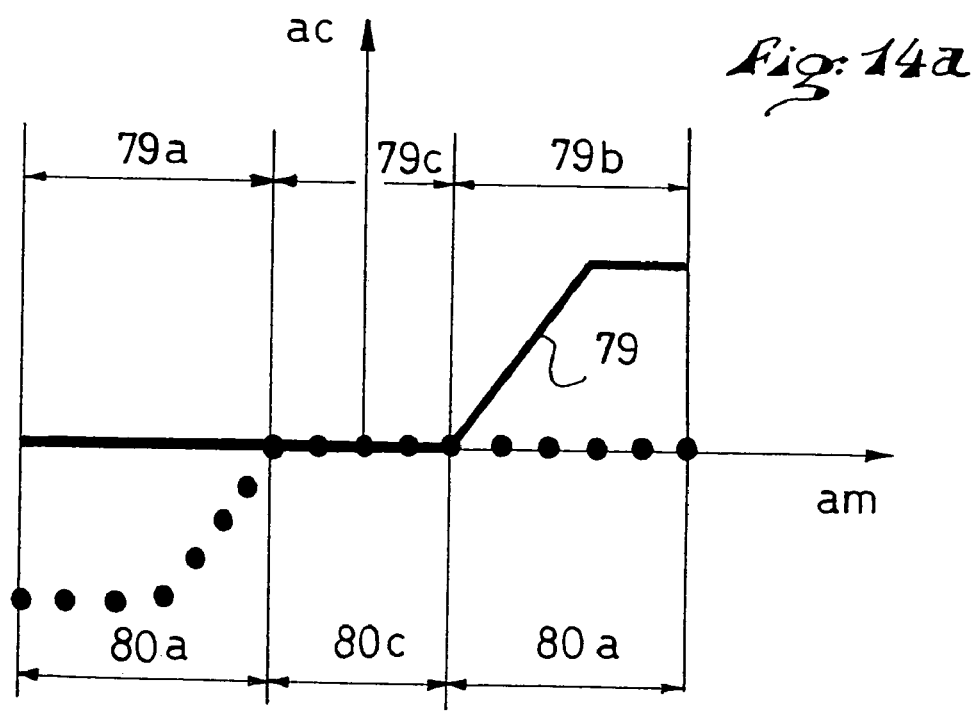
FIG. 14a is a diagram showing the functioning of the cam relative to FIG. 14.

The diagram of FIG. 14a schematically shows the angle "ac" of the pawls as a function of the driving angle "am". The inactive 79a and 80a, active 79b and 80b, and re-centering 79c and 80c phases of the two cam grooves are shown relative to one another in the diagram, depending on the rotation of the motor. Thus, one obtains an angular re-centering of the cam 76, with a relatively broad tolerance and an active surface of one pawl corresponding to an inactive phase of the other pawl.

During the displacement of the cam in either direction of rotation, the rotation stops when one of the tracking fingers abuts against the end of its radial cam groove. For example, the electronic circuit 74 includes a module that detects an excessive intensity in the supply of the motor resulting from its rotational blocking, and which controls the interruption of the supply when the excessive intensity is detected. Other control modes can be used. In particular, a timer can be provided in the electronic circuit 74 to cut off the supply of the motor after a predetermined period of time equal to or greater than the time required by the motor to complete its course.

The electric motor 75 also ensures the return of the cam to its median angular position. The device that enables the return of the cam to its median angular position includes an axial ramp 81 that cooperates with an axial tracking finger 83.

The axial ramp includes two helical blade-shaped elements 95, 96 and two dihedral stop abutments 97, 98. The axial ramp is symmetrical relative to the resting position of the tracking finger in the median angular position of the cam shown in FIG. 15. This resting position of the finger defines a plane perpendicular to the axis of rotation of the cam, the outline of which is marked by the broken line 99 in the plane of FIG. 15.

The tracking finger 83 is movable along an axial direction on each side of the plane 99. For example, it is mounted on a piston 84 guided translationally along an axial direction in a housing 88 of the motor support plate 89. The piston 84 is movable on both sides of a centered position to which it is returned by a spring 93. For example, the piston is hollow, and it encloses the return spring with a nipple 90, 91 mounted on each end of the spring. The nipples are slidably mounted relative to the piston; they are retained to the piston by their widened base, and their projecting end is in support against the walls of the housing 88. In this way, the piston can move along an axial direction by compressing the spring and by driving along one of the nipples, thereby ensuring a very stable re-centering along the line 99 due to its bilateral pre-constraint.

Figure 15:
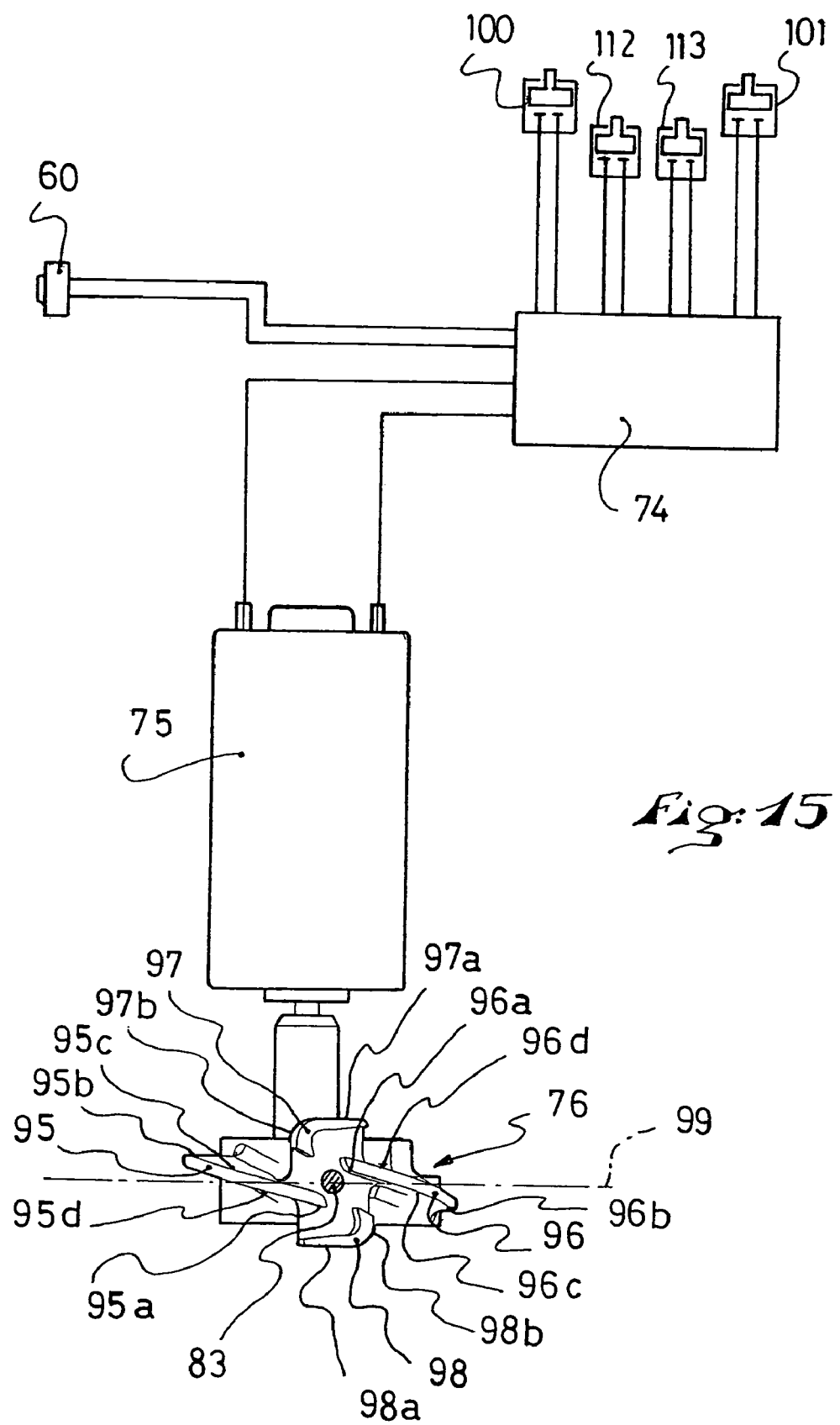
FIG. 15 is a top view of the cam and its drive motor.
Figure 16:
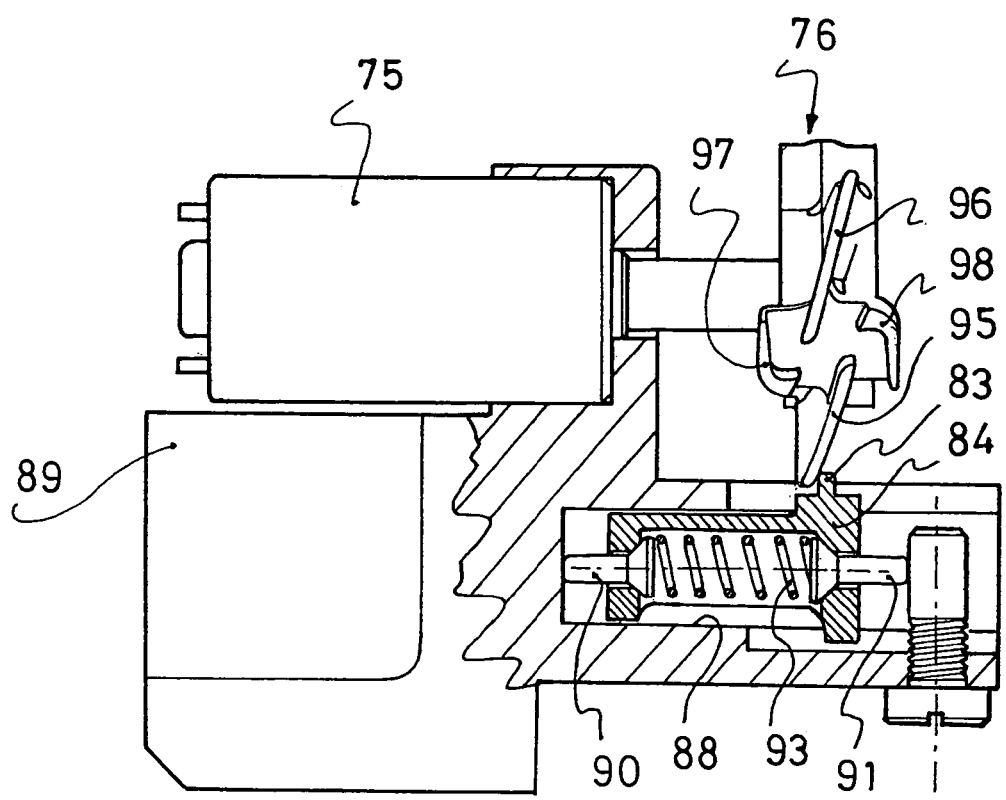
FIG. 16 shows a partial sectional view that illustrates the mounting of the tracking finger of the cam of the previous figure.

The two blades 95, 96 each extend over an angular portion of the cam, which is smaller than the amplitude of rotation of the cam 83 for each of its rotational movements on both sides of its median angular position shown in FIG. 15. The relative position of the blades is defined relative to the cross-sectional dimensions of the finger in the plane of FIG. 15. The blades each have an inlet 95a, 96a and an outlet 95b, 96b, as well as two active surfaces 95c, 96d for the blade 95, and 96c, 96d for the blade 96.

Each blade is inclined relative to the plane 99, such that its inlet and outlet are located on a different side of the plane. Moreover, the inlets 95a, 96a of the blades are positioned on each side of the plane 99. Similarly, the outlets 95b, 96b of the blades are located on each side of the plane, the side being the side opposite that of their respective inlet. In view of their inclination, the blades each have a ventral active surface 95c, 96c facing each other, and a dorsal active surface 95d, 96d. The inlets 95a, 96a are spaced apart along the perimeter of the cam, over a distance that is greater than the cross-sectional dimension of the finger, so that, in the median angular position of the cam shown in FIG. 15, the tracking finger 83 can freely circulate between the blades along an axial direction. Along this same axial direction, the two inlets 95a and 96a of the blades are offset with respect to one another on each side of the plane 99, over a distance greater than the cross-sectional dimension of the finger, so that, during a rotation of the cam, the finger 83 naturally comes in contact with the ventral surface of either one of the blades. The outlets 95b and 96b of the blades are each offset along an axial direction relative to the plane 99, by a distance greater than one half of the cross-sectional dimension of the finger.

The stop abutments 97 and 98 face one another on both sides of the plane 99, in the area of the inlets 95a and 96a of the blades and in the extension of the dorsal surfaces 95d, 96d, with one surface 97a, 98a being substantially parallel to the plane 99 and one surface 97b, 98b being approximately parallel to an axial direction.

Figure 17:
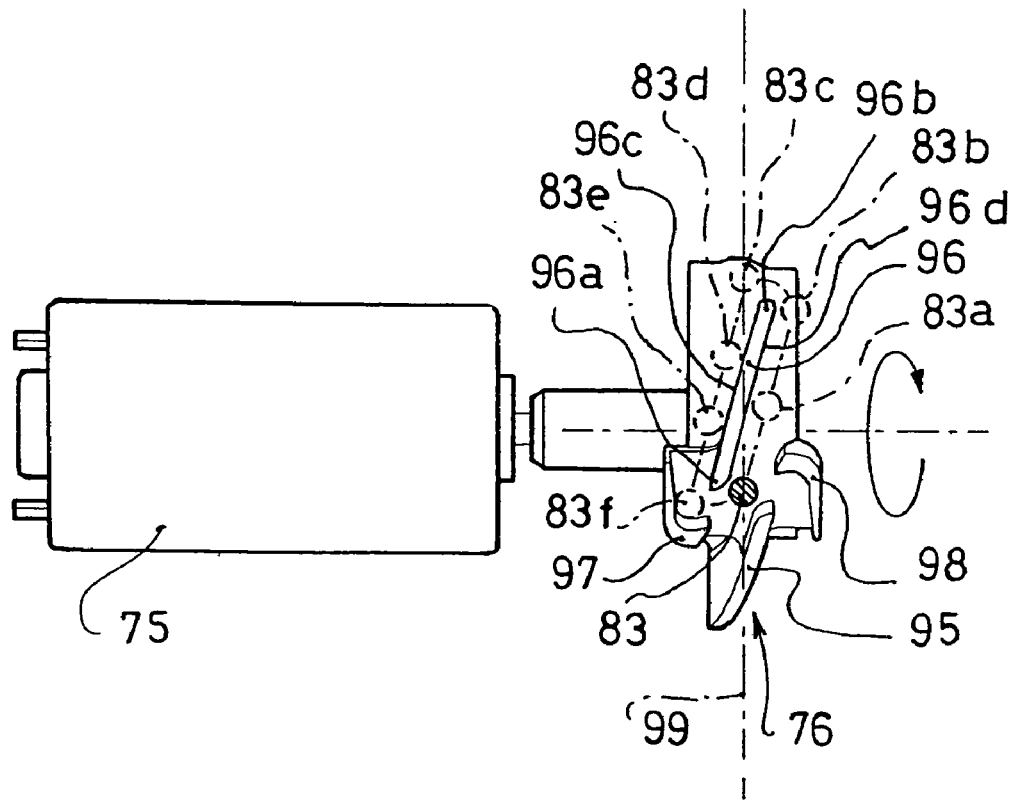
FIG. 17 shows the cam re-centering mode.

FIG. 17 shows the various positions of the finger 83 relative to the blade 96 for a to-and-fro cycle of the cam 76, being understood that it is the cam 76 that is rotationally driven. During the forward phase, the finger 83 is deviated by the ventral surface 96d of the blade. The positions 83a and 83b show this phase of the movement. Next, the finger 83 escapes from the blade 96 and is returned in the plane 99 by the return spring 93. This is shown by means of the position 83c. It is noted that the rotation of the cam is stopped in this forward phase by the ratchet tracking finger coming in abutment at the end of its radial cam groove 79. In the return phase of the cam, the finger 83 is deviated by the dorsal surface 96c of the blade. This is shown by means of the positions 83d and 83e of the finger. Next, the finger escapes from the blade; however, due to its inertia, it is captured by the stop abutment 97. This is shown by means of the position 83f of the finger. The rotation of the cam is then blocked, and this blocking continues as long as the supply of the motor is maintained. As soon as the supply is cut-off, the cam releases its constraint from the finger 83, which is returned to its median position by the spring.

For a cycle of rotation of the motor in the other direction, the finger cooperates in the same manner as with the blade 95.

Figure 17A:
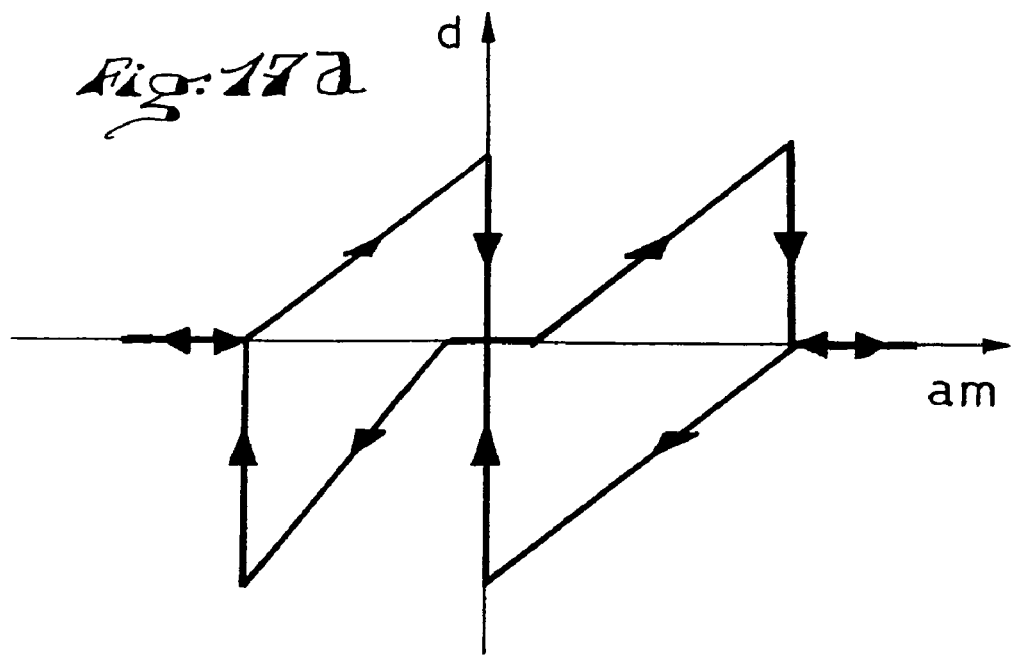
FIG. 17a is a diagram showing the functioning of the cam relative to FIG. 17.

The diagram of FIG. 17a shows the axial displacement "d" of the finger 83, as a function of the angle "am" of rotation of the motor 75 in its two directions of rotation.

The electronic circuit that drives the rotation of the motor is controlled by two switches 100 and 101, each controlling one direction of rotation of the motor. The circuit 74 is also connected to the switch 60 which provides information about the angular position of the positioning element at its stable indexed positions.

Figure 18:
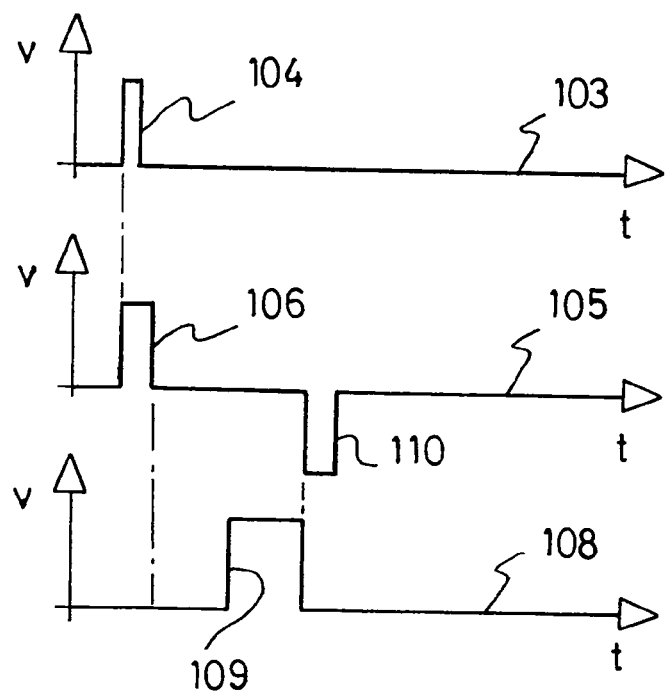
FIGS. 18 and 19 are diagrams showing the control signals according to two exemplary circumstances.

FIG. 18 shows a diagram having three curves that illustrate various control signals. The top curve 103 shows the signal coming from one of the control switches 100 or 101, and the interval 104 corresponds to a gearshift control.

The middle curve 105 is relative to the motor supply voltage. The interval 106 of this curve corresponds to the voltage that is applied to the motor in order to return the cam 76 from its median angular position, in the direction of rotation associated with the switch that has been activated. The interval 106 shown corresponds to a positive voltage. In the case where the other control switch is activated, there would an inverse polarity voltage.

The width of the interval is driven by a module of the circuit 74 which detects any excessive load at the terminals of the motor, this excessive load indicating that the motor is blocked because the cam has reached its final angular position. As has already been mentioned, the width of the interval 106 can alternatively be driven by a timer. By way of example, the control time is on the order of 10 ms.

The bottom curve shows the signal coming from the switch 60. The ascending front of the interval 109 indicates that the positioning element 52 has left its indexing stable position, and the descending front indicates that the positioning element 52 is about to reach an adjacent indexing position. The ascending front 109 intervenes one time interval after the descending front of the interval 106, the time interval being the time that is necessary for the control element 57 to complete its alternating movement cycle and for one of its teeth to abut against the pawl that has been activated by the rotation of the motor. The width of the interval varies; it is dependent upon the rotational speed of the positioning element, which is related to the rotational speed of the pulley 40.

Once the descending front of the interval 109 is detected, the circuit 74 sends to the motor 75 a control signal illustrated by the interval 110 having a polarity opposite that of the interval 106 in order to return the motor, in the opposite direction, until the median angular position of the cam 76.

Additional timers can be provided to timely offset the signals with respect to one another.

Figure 19:
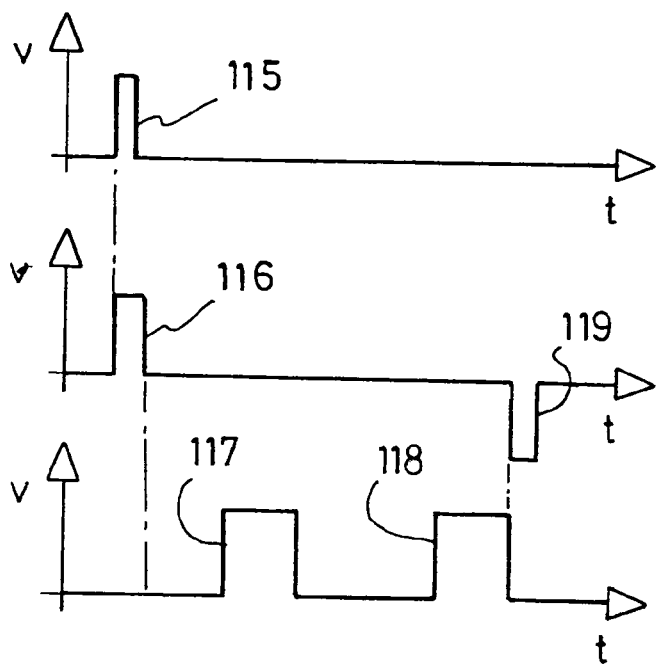

FIG. 19 shows a similar diagram in the case of a simultaneous control several gearshifts.

In this case, for example, the circuit 74 receives a control signal from two switches 112, 113 assigned to this control mode. The signal 115 of one of these switches initiates a motor control interval 116. As previously, the positioning element 52 reacts at the end of a predetermined time interval, then it moves toward the adjacent indexing position; this generates the interval 117 in the area of the switch 60. After this stable position has been reached, the control element 57 is driven in the opposite direction; the pawl that has been activated does not oppose this rotation, and due to its associated metallic blade, the pawl slides along the non-blocking surface, and then comes back down to the base of the blocking surface of the adjacent tooth of its toothed crown. When the rotation of the control element is again reversed, the pawl again blocks the control element; which causes the rotation of the positioning element for a new indexing pitch, thereby generating a second interval 118 in the area of the switch 60. Once the descending front of the interval 118 has been detected, the circuit 74 sends to the motor a control slit 119 for the return to the median angular position.

Figure 20:
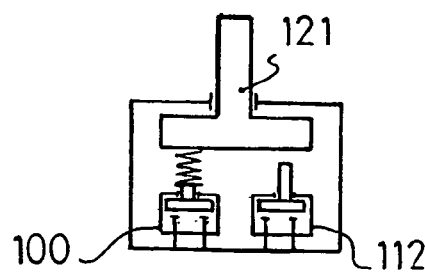
FIG. 20 shows an alternative mounting of the control switches.

The switches 112 and 113 can be integrated with the switches 100 and 101, respectively, into the same control member activated by an actuator having successive support positions. This is shown in FIG. 20 for the switches 100 and 112. For a first support position, the actuator 121 activates the switch 100, and for a more extensive support position, the switch 112 is then activated. Other modes of construction can be used.

As an alternative for the control by the switches 112 and 113, one could measure the length of time during which the switch 100 or 101 is activated, and initiate a multiple, double, or even triple gearshifts, or more, depending upon this activation duration. Other control modes can be used.

In particular, the control element could be driven by means of two electromagnets, as disclosed in the documents EP 0 558 425 and U.S. Pat. No. 5,358,451. A motorized control is however preferred, since it is economical; there is only one electromechanical element that is compact, reliable and lightweight.

The control element could also be driven by means of a mechanical control, as disclosed, for example, in the patent documents FR 2 621 372; FR 2 621 373; and U.S. Pat. No. 4,887,990.

Figure 21:
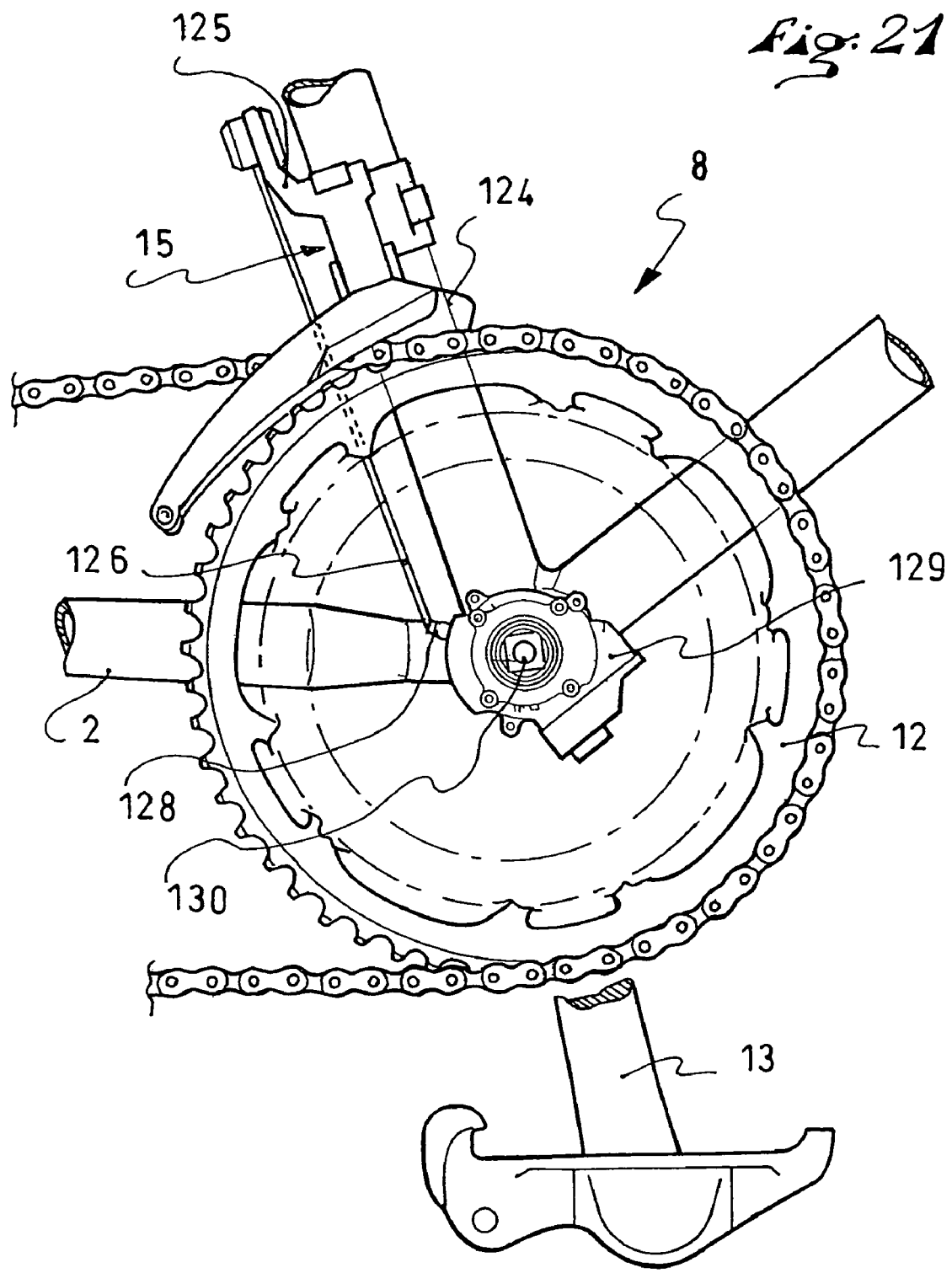
FIG. 21 shows a side view of a front transmission subassembly according to another embodiment of the invention.

FIG. 21 and the subsequent drawing figures show the invention as applied to a front derailleur. The difference with the rear derailleur mainly lies in the diameter of the chainwheels and in the fact that the derailleur acts on the tensioned side of the chain. The tension of the chain may then be such that it opposes the displacement of the fork of the derailleur, particularly in the toothed sectors of the chainwheel that are not provided for facilitating the transfer of the chain. As a general rule, a chainwheel includes one or two toothed sectors that promote the transfer of the chain. The sector(s) is/are arranged in zones corresponding to the idle times when the crank arms pass through the vertical line, and when the force exerted by the cyclist on the crankset pass through a minimum.

FIG. 21 schematically shows the front subassembly 8 with the chainwheels 12 and the front derailleur 15. For reasons of clarity, only the largest chainwheel is partially shown; the other chainwheels are shown by means of broken lines. Generally speaking, there are typically two or three chainwheels.

The front derailleur 15 is of any appropriate type, with or without a return spring, and will not be described in detail. For example, as is visible in the drawing figure, it includes a cage 124 that straddles the tensioned side of the chain and forms the body of the derailleur. The cage is borne by a set of linkage members that are connected to the frame and ensure a displacement of the cage at least along a direction parallel to the shaft of the crankset. The displacement of the cage 124 is driven by an arm 125 affixed to one of the connecting rods. The arm 125 is connected by a rod 126 to an indexing arm 127 at the outlet of the driving unit 128, which will now be described. As an alternative for the rod, a traction cable coupled to a low rigidity return spring could be used in the area of the linkage members.

The driving unit 128 is housed in a casing 129 mounted on the frame 2 and through which the shaft 130 of the crankset extends.

FIG. 22 shows the driving unit 128 before it is mounted on the shaft 130. This drawing figure shows a crankset casing. This casing is of any appropriate type and, therefore, has not been described in detail. Conventionally, it includes the shaft 130, bearings that are not visible in the figure, and two threaded rings 133, 134 for tightening the casing in the crankset box of the frame, which enclose a spacer 132.

Compared to a conventional casing, the casing of FIG. 22 further has a flange 136 that is positioned between the crankset case and the head 134a of the tightening ring 134. The flange has lugs 136a, 136b, 136c for fastening the casing 129. The casing is thus immobilized relative to the frame in an orientation where its indexing arm 127 can properly actuate the derailleur 15.

The casing 129 is traversed by one end of the shaft 130, and as can be seen in FIG. 22, this end of the shaft 130 has a cylindrical collar 138 revolving about an axis parallel to the axis of the shaft and off-centered relative to this axis. In this way, the collar forms a first driving element that is non-centered on the axis of the shaft, but rotationally affixed to this shaft.

FIG. 23 shows an exploded view of the various elements of the driving unit that are housed within the casing 129.

These elements include a positioning element 141 with its indexing device 142, a control element 144 with its blocking device 145, and a transmission element 146 connected to the driving element, on the one hand, and the control and positioning elements, on the other hand. In addition, FIG. 23 shows two bearings 148 and 149 located between the shaft 130 and the positioning element 141.

The positioning element 141 here includes two concentric elements, namely a rotor 150 and a motive wheel 151 that are rotationally coupled to one another by means of a pre-stressed angular compensation spring 152.

The indexing arm 127 is rotationally affixed to the motive wheel 151. In the preferred case of a connection between the arm 127 and the derailleur 15 by a rigid rod, there is a direct coupling between the rotation of the motive wheel 151 and the displacement of the cage 124 for the two directions of rotation of the wheel. The compensation spring 152 rotationally connects the rotor 150 and the motive wheel 151, and it permits an angular phase shift of these two elements in the two directions of rotation of the rotor when the torque transmitted between these two elements exceeds a predetermined threshold.

Figure 24:
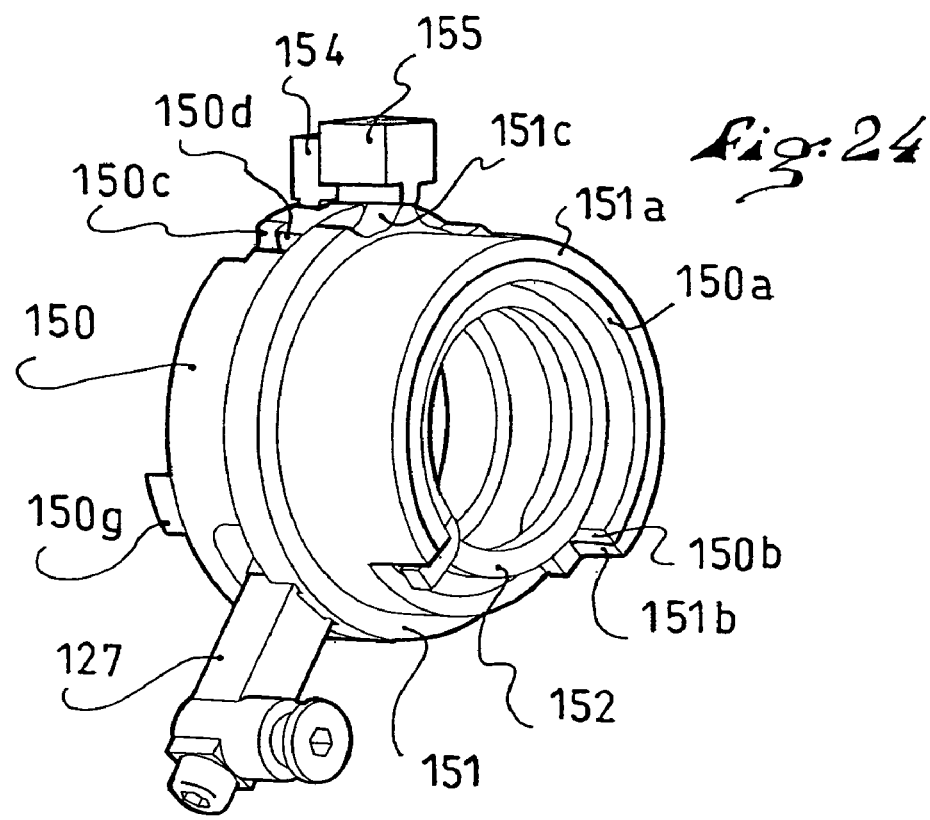
FIG. 24 shows a perspective view of the positioning element and its indexing device.

For example, as is visible in FIGS. 23 and 24, the rotor and the motive wheel each have a central hub 150a, 151a, with each having a cutout 150b, 151b. The two hubs are nested in one another, such that the cutouts 150b, 151b coincide with one another. The spring 152 is a cylindrical torsion spring; its two ends are bent so as to be supported against the edges of the two cutouts 150b, 151b. When one of the elements pivots relative to the other, it drives along one of the ends of the spring which returns these elements with respect to one another so as to reposition the cutouts 150b, 151b in coincidence.

Other modes of construction can be used for the elastic return of the two elements.

The rotor 150 has a first indexing device that defines stable positions of the positioning element relative to each of the chainwheels of the crankset. For example, the rotor 150 has on its periphery a channeled zone 150c having channels that are provided to cooperate with a piston 154 returned by a spring. The piston and the spring are housed in the casing 129. The number and the arrangement of the channels are determined as a function of the length of the indexing arm 127 and of its initial orientation, so that, at each of the stable positions, the arm positions the cage 124 of the derailleur in correspondence with each chainwheel of the crankset.

When the rotor 150 is displaced from one stable position to the next, it drives the motive wheel along by means of the compensation spring 152. The coupling of the spring enables the rotor to reach its new stable position even if the chain, due to its tension, momentarily opposes the displacement of the cage and therefore the rotation of the motive wheel 151.

Indeed, in the case where the zone of the chainwheel in use, which is opposite the cage, is not favorable to a chain transfer, the chain, by means of its tension, can oppose the displacement of the cage, and thereby the rotation of the motive wheel. Generally speaking, a chainwheel has one or two toothed sectors favorable to a transfer of the chain, which are preferably located in the idle time zones of the chainwheel. Therefore, a turn or half of a turn of the crankset may be needed, as the case may be, in order for a favorable sector to be presented under the cage.

On this assumption, the positioning element is equipped with a second indexing device that retains the rotor 150 in its new stable position as long as the motive wheel has not reached the rotor, and as long as the chain transfer has not occurred.

The second indexing device includes a second piston 155 that cooperates with a channeled zone 151c of the motive wheel 151, as well as a channeled zone 150d of the rotor 150. The piston 155 is movable, and it is returned by a spring. The second piston 155 cooperates with both a channeled zone of the motive wheel and a channeled zone of the rotor.

The piston 154 marks the stable indexing positions of the rotor 150. As a result, the recess of the channels and the boss of the piston are relatively widened out.

The piston 155 ensures a temporary locking of the rotor 150. As a result, the channels of the zone 150d and the lateral sides of the engaging portion of the piston 155 are relatively abrupt.

The channels of the channeled zones 151c guide the downstroke and upstroke of the piston 155. The recess of the channels is relatively wide, and the lateral sides are inclined to be capable of creating a ramp effect on the piston 155.

Figure 25:
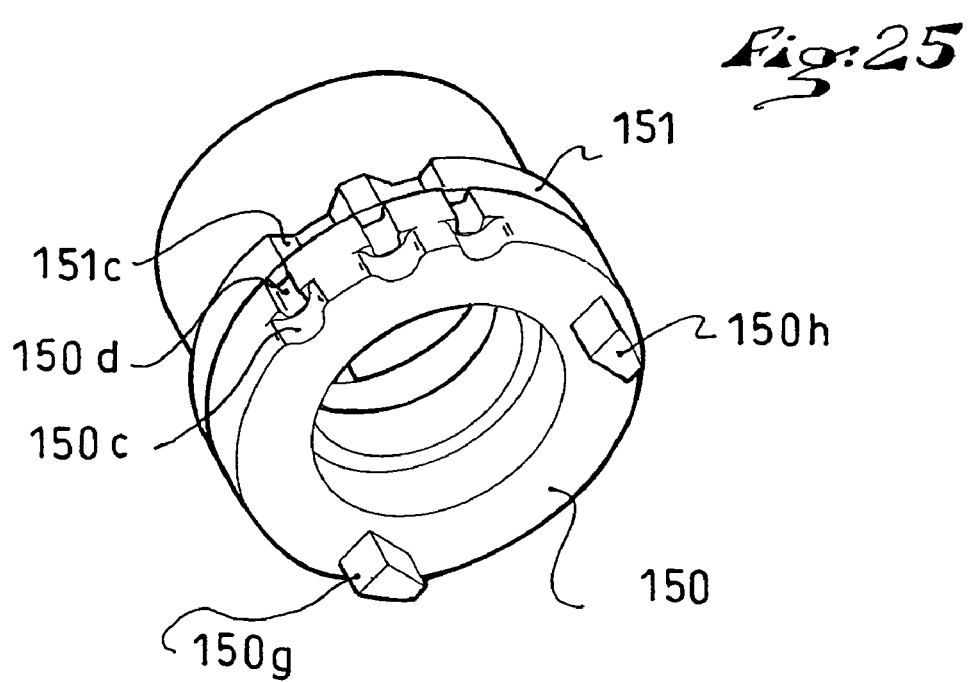
FIG. 25 shows a detail of construction of the positioning element.

FIG. 25 shows the relative position of the channeled zones of the rotor and of the motive wheel, without angular offset of these two elements.

Figure 26A:
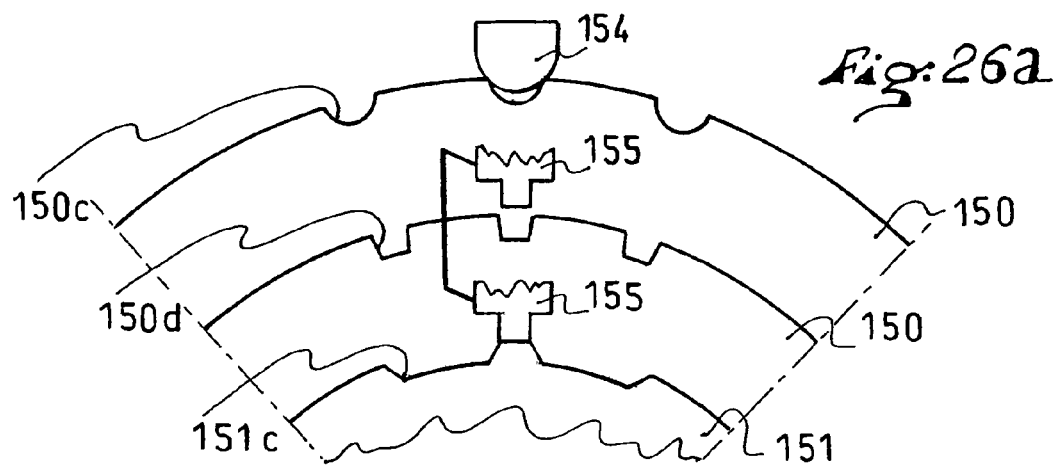
FIGS. 26a, 26b, 26c show the functioning mode of the positioning element.
Figure 26B:
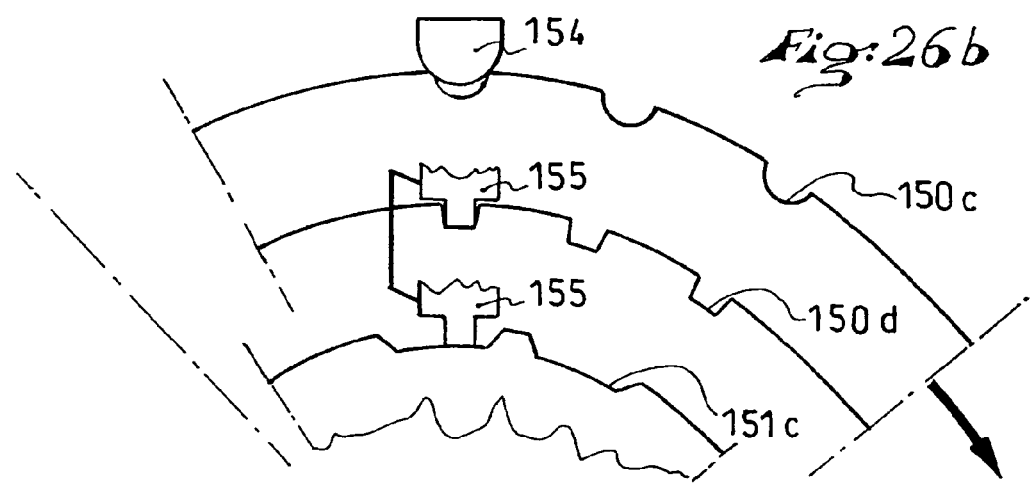
Figure 26C:
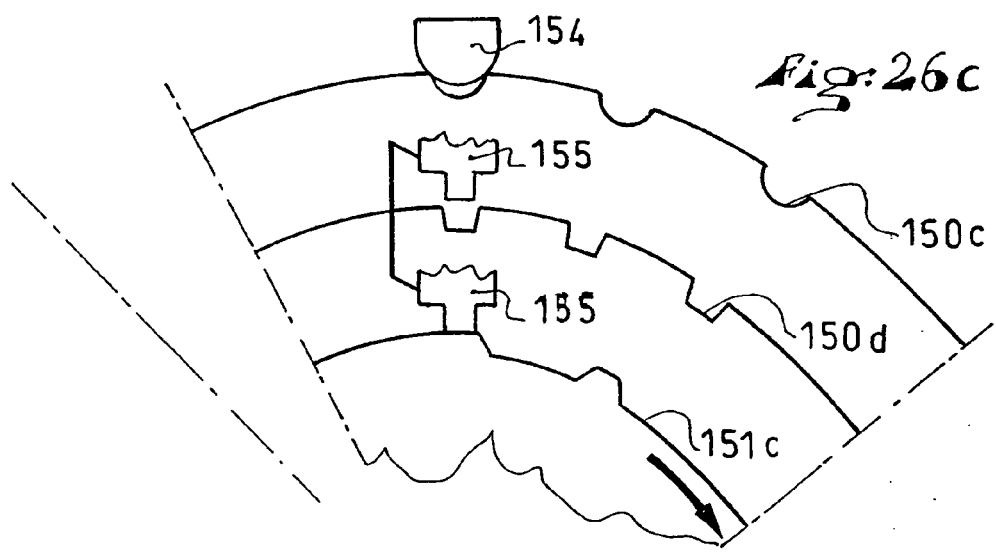

FIGS. 26a, 26b, 26c schematically show a rotation of the positioning element in the case where the motive wheel is momentarily hindered in its rotation by the tension of the chain.

The embodiment shown corresponds to a crankset having three chainwheels, i.e., the channeled zone 150c of the rotor 150 has three recesses, each of which relates to a chainwheel of the crankset.

As can be seen in FIG. 25, the recesses of the channeled zones 150c and 150d coincide with one another. The channeled zones 151c and 150d are side by side, and the channels are opposite, i.e., a tip of one corresponds to a recess of the other.

In FIG. 26a, the piston 154 is in the middle recess of the zone 150c. The piston 155 is opposite the middle recess of the zone 150d, but it is kept outside of the recess because the engaging portion of the tooth is on a tip of the zone 151c.

In FIG. 26b, the rotor 150 has pivoted up to an adjacent indexing position marked by the engagement of the piston 154 in an adjacent recess of the zone 150c. The motive wheel 151 has initiated a partial rotation that enables the piston 155 to lower itself, as it is simultaneously opposite the recess of the zones 150d and 151c.

In this position, the spring 152 returns the rotor toward its original indexing position and the motive wheel toward its next indexing position.

The rotor is however blocked by the engagement of the piston 155 in the channeled zone 150d.

When a favorable sector is presented in the area of the cage, the spring 152, due to its tension, completes the displacement of the motive wheel toward its new indexing position, and the piston 155 is released from the recesses of the channeled zone 150 by a ramp effect generated by the channeled zone 151c and the arrival of a new tip under the engagement portion of the piston 155.

Such a construction mode makes it possible to memorize a gearshift control, starting with a relative brief control, until the derailleur is capable of executing that particular control.

Figure 27:
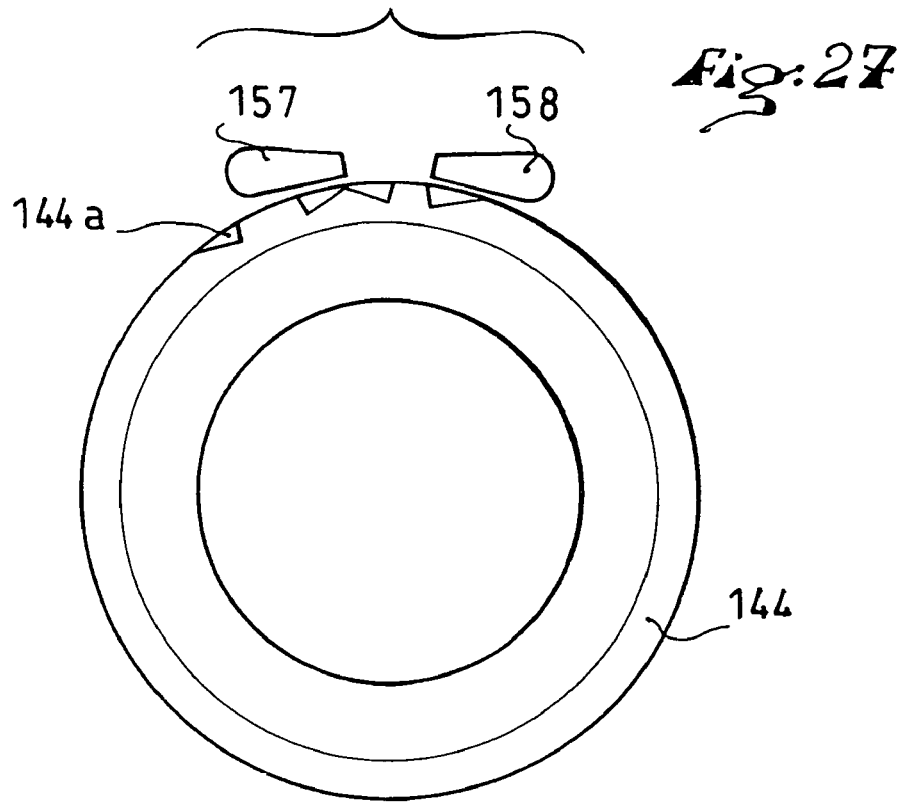
FIG. 27 shows the control device and its blocking device.
Figure 28:
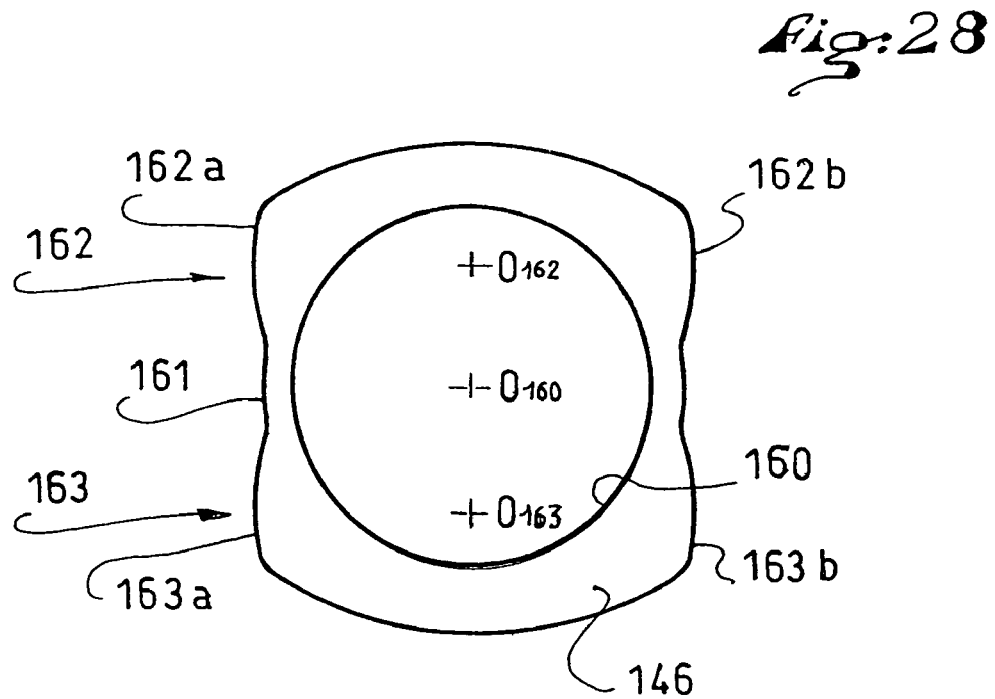
FIG. 28 shows the transmission element.

The control element 144 associated with the transmission element 141 is shown in FIG. 27. As in the preceding case, it is a kind of drum mounted to rotate freely relative to the axis of the shaft 130. In the embodiment shown, the drum 144 is guided from the outside relative to the casing 129, but it could also be mounted on the axle, if necessary, with an intermediate bearing.

The blocking device 145 is of the same type as that described above. It includes two rotatable pawls 157 and 158 that are capable of engaging in the teeth of a toothed zone 144a located on the periphery of the control element 144. As in the preceding case, the teeth include a sloping blocking surface and a non-blocking surface. The pawls cooperate with the teeth so as to be capable of blocking the rotation of the drum in its two directions of rotation. For a crankset having three chainwheels, the control device must be capable of transmitting two upshift controls and two downshift controls at the most. Therefore, two teeth are provided each time to cooperate with a pawl in order to transmit a chainwheel upshift or downshift control.

Under normal operating conditions, the two pawls are released from the teeth. During a gearshift command, one of the pawls lowers itself, depending upon whether it is an upshift or downshift control, in order to block one of the teeth.

The transmission element 146 is in the form of a ring. It has a central housing 160 that is adjusted to the diameter of the eccentric collar 138 of the shaft 130.

Externally, the ring 146 has the general shape of a diabolo in cross-section with, on the two sides opposite of the narrow middle portion, two circular portions 162 and 163 each including two arcs 162a, 162b, 163a, 163b. These circular portions are centered at imaginary points $O_{162}$ and $O_{163}$ that are located on opposite sides of the center $O_{160}$ of the central housing 160.

Figure 29:
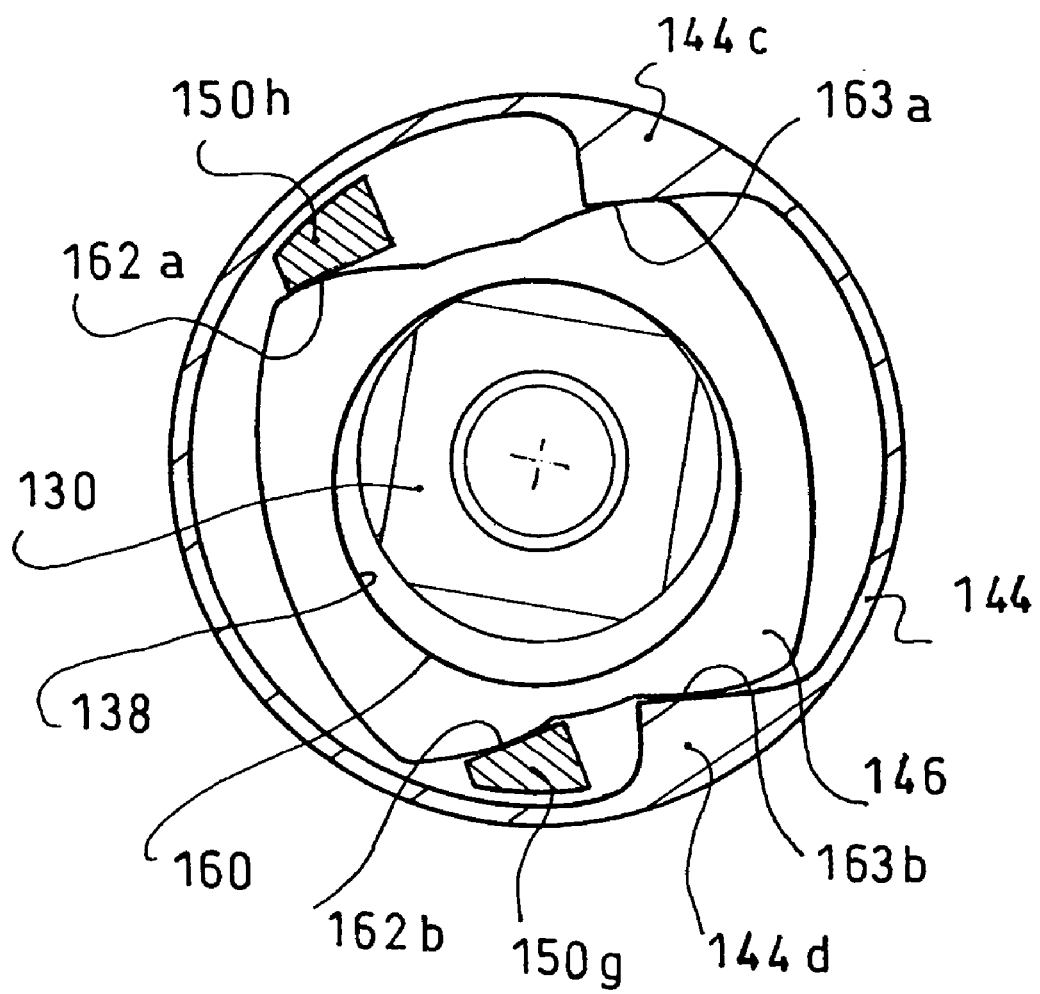
FIG. 29 shows the connection between the transmission element and the other elements.

FIG. 29 shows the ring 146 mounted on the eccentric collar 138 and the shaft 130, and housed in the central recess of the control element 144. When the shaft 130 rotates, the center $O_{160}$ of the central housing of the ring is actuated with a circular movement about the axis of the shaft 130.

In its central recess, the element 144 has two protuberances having 144c and 144d having facing surfaces that are parallel and spaced apart by a distance corresponding to the diameter of the circular portion 163 of the ring 146. The surfaces of the two protuberances define a groove in which the circular portion 163 circulates. In the same fashion, protuberances 150g and 150h extending from the rotor 150 form a groove for the circular portion 162, Thus, the construction principle substantially repeats that of the alternative embodiment described in connection with FIG. 11. Other construction modes are also suitable.

The assembly functions in the following manner.

Under general operation conditions, the rotor is kept in an indexing stable position by its indexing device, and the ring 144 is driven in a circular movement by the eccentric collar 138.

As a result, the ring takes support on the two protuberances 150g and 150h that are immobile, and it is actuated with a complex movement that includes a reciprocating movement in the groove formed by the protuberances and an oscillating movement about the imaginary center $O_{162}$ of the portion 162. As a result of this latter movement, the portion 163 is actuated with a rocker movement that drives along the control element 144 along an alternating movement about the axis of the shaft 130.

The spacing of the pawls and the arrangement of the teeth of the toothed zone 144a is determined so that a blocking tooth circulates under each of the pawls.

When one of the pawls is lowered, it blocks one tooth of the element 144 when that tooth comes back on it. As a result, the control element is immobilized; it retains the portion 163 of the ring; this returns the rocker movement of the ring toward its portion 162. The portion 162 then drives along the rotor which leaves its stable position toward an adjacent position.

One this position is reached, the pawl engaged is lifted in order to release the element 144 before the ring initiates its return movement that would bring the rotor back to its original position.

Depending upon the pawl that is actuated, the control element 144 is blocked in either direction. As a result, it can drive the positioning element in either direction.

The distances between the imaginary centers $O_{160}$, $O_{162}$ and $O_{163}$, the pitch of the toothing of the zone 144a, the pitch of the channeled zones 150c, 150d and 151c are determined as a function of one another, such that the total amplitude of the rocker movement of the element 146 is capable of pivoting the elements 144 or 150 over an angle greater than a toothing pitch or an indexing pitch, respectively.

Figure 30:
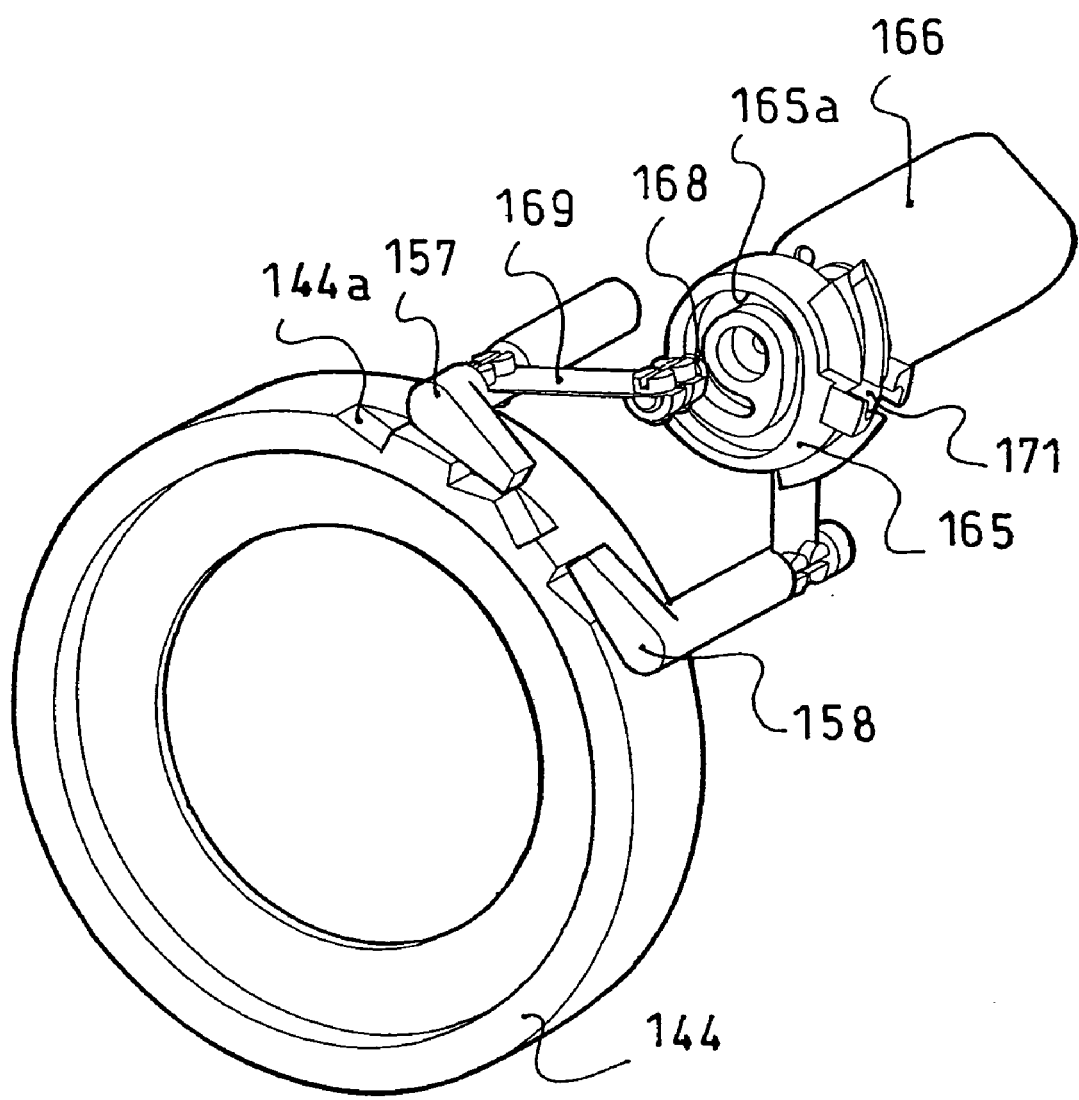
FIG. 30 shows the device for guiding the pawls.

FIG. 30 shows the control element 144 and its driving device. This device is similar to that described previously, with a cam 165 mounted on the shaft of an electric motor 166. The cam 165 has a radial cam groove on each of its surfaces. Each cam groove is connected to a pawl by means of an elastic blade. FIG. 30 shows the radial cam groove 165a that drives the pawl 157 by means of the tracking finger 168 and of the elastic blade 169. The cam further has an axial cam 171 that is followed by a radial tracking finger not shown in the figure. All of these elements are similar to those described above in connection with FIGS. 13-20; reference will therefore be made to this portion of the description for more detail. An electromagnet or mechanical driving device can also be used here.

FIG. 31 is a schematic view that shows the positioning of the various elements in the casing 129.

Thus, the figure shows the indexing arm 127 which extends through the wall of the casing, in the area of an opening 177, as well as the cam 165 which drives the pawls 157 and 158, the motor support plate 173 which also carries the electronic circuit, and a connector 174.

The assembly is made impervious by a seal arranged between the shaft 130 and the wall of the crank case traversed by the shaft, as well as by a bellows not visible in the figures, which envelops the opening 177, the indexing arm 127 and the base of the linkage 126. Other sealing means are suitable.

Thus, the invention that has been described makes it possible to manufacture a derailleur that is compact, and in which imperviousness is easy to control in the area of the moving parts, since it is obtained on rotational movements.

The present description is only provided by way of example; other embodiments of the invention could be adopted without leaving the scope thereof.

The invention claimed is:

1. A gearshift control device for a chain and sprocket transmission system, said device comprising:
    a gearshift member movable along a direction transverse relative to a plane defined by the chain, said gearshift member comprising an indexing arm;
    a shaft extending along an axis;
    a first element comprising a driving element mounted to rotate continuously about the shaft by action of an external movable component;
    said driving element having a rotatable drive member, non-centered or non-concentric with respect to the axis of the shaft, said drive member adapted to generate a periodical movement during rotation of said drive member;
    a second element comprising a positioning element mounted for rotation about the shaft and adapted to displace said indexing arm of the gearshift member;

an indexing device defining a plurality of angular stable, but non-blocked positions of said positioning element about the shaft;

a third element comprising a control element mounted for free rotation about the shaft;

at least one blocking device for momentarily blocking the rotation of the control element about the shaft;

a transmission element between the driving element, the positioning element, and the control element;

the transmission element being mounted for rotation, in a non-concentric manner, relative to said shaft;

the transmission element bearing three connecting members arranged at a distance from one another, said three connecting members comprising:

a first connecting member, said first connecting member comprising tracking member connected to the driving element;

a second connecting member connected by a pivotable connection to the positioning element; and a third connecting member connected by a pivotable connection to the control element;

the gearshift control device functioning such that, as the driving element is rotationally driven by said external movable component, the positioning element is retained in an angular stable position by the indexing device, and the control element is not blocked by the blocking device, the transmission element is actuated with an oscillating movement relative to the connection with the positioning element via the second connecting member, the control element being actuated with a rotational alternating movement about the shaft via the third connecting member, and upon a momentary blocking of the control element by the blocking device, the transmission element is actuated with a movement relative to the connection with the control element via the third connecting member, the positioning element being actuated with a rotation about the shaft via the second connecting member.

2. A gearshift control device according to claim 1, wherein:
the driving element is a pulley rotatable about the axis of the shaft;
the drive member of said first element is a groove that is non-concentric relative to the shaft and located in a surface of the pulley;
the transmission element is a ring having a projecting pin engaged in the groove.

3. A gearshift control device according to claim 1, wherein:
the drive member of said first element is a hub or is a collar off-centered relative to the axis of the shaft; and
the transmission element is a rocker or is a ring rotationally mounted on the off-centered hub or collar, respectively.

4. A gearshift control device according to claim 1, wherein:
the drive member is a pin off-centered relative to the axis of the shaft; and
the transmission element is a bar having a slot, the pin extending through said slot.

5. A gearshift control device according to claim 1, wherein:
on the transmission element, the second connecting member and the third connecting member are spaced from one another and substantially at equal distance from the first, tracking connecting member.

6. A gearshift control device according to claim 1, wherein:
the positioning element comprises a rotor rotationally mounted about the shaft, said rotor having a periphery borne by a cam for driving the indexing arm of the movable gearshift member.

7. A gearshift control device according to claim 1, wherein:
the positioning element comprises a rotor connected to the transmission element by a connecting member, and a motive wheel bearing the indexing arm of the gearshift member, the rotor and the motive wheel being rotationally mounted about the shaft and connected to one another by an angular compensation spring.

8. A gearshift control device according to claim 7, wherein:
the indexing device of the positioning element includes two indexing pistons and three channeled zones;
the first piston cooperates with a channeled zone for indexing the rotor; and
the second piston cooperates with a channeled zone of the motive wheel and a channeled zone for locking the rotor.

9. A gearshift control device according to claim 1, wherein:
the gearshift member is a pulley supported by a deformable parallelogram structure including linkage members and a base connected to one another by articulation axes;
the indexing arm is rotationally affixed to a stirrup mounted on the articulation axis between one of the linkage members and the base;
the stirrup straddles a linkage member; and
an adjusting mechanism adapted to adjust angular deviation between the stirrup and the linkage member.

10. A gearshift control device according to claim 1, wherein:
the control element comprises peripheral teeth, each of the teeth having a sloping blocking surface and a non-blocking surface for engagement with two blocking pawls.

11. A gearshift control device according to claim 10, wherein:
each of the pawls is connected to a radial cam groove of a cam.

12. A gearshift control device according to claim 11, wherein:
the cam is driven by a motor having two directions of rotation.

13. A gearshift control device according to claim 12, wherein:
the cam has an axial ramp followed by an axial tracking finger for returning the cam to a median angular position.

* * * * *